US012578563B2

(12) United States Patent
Ohtake

(10) Patent No.: US 12,578,563 B2
(45) Date of Patent: Mar. 17, 2026

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Fumiaki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 620 days.

(21) Appl. No.: 17/788,214

(22) PCT Filed: Nov. 11, 2020

(86) PCT No.: PCT/JP2020/042052
§ 371 (c)(1),
(2) Date: Jun. 22, 2022

(87) PCT Pub. No.: WO2021/131369
PCT Pub. Date: Jul. 1, 2021

(65) Prior Publication Data
US 2023/0038734 A1    Feb. 9, 2023

(30) Foreign Application Priority Data

Dec. 23, 2019    (JP) ................................. 2019-231280

(51) Int. Cl.
*G02B 15/20* (2006.01)
*G02B 13/02* (2006.01)
(Continued)

(52) U.S. Cl.
CPC ............. *G02B 15/20* (2013.01); *G02B 13/02* (2013.01); *G02B 13/06* (2013.01); *H04N 23/69* (2023.01)

(58) Field of Classification Search
CPC ........ G02B 15/20; G02B 13/02; G02B 13/06; G02B 15/1461; H04N 23/69; G03B 5/00; G03B 17/02
See application file for complete search history.

(56) References Cited

U.S. PATENT DOCUMENTS 5,532,881 A    7/1996  Nakatsuji et al.
5,717,526 A    2/1998  Ohtake
(Continued)

FOREIGN PATENT DOCUMENTS

JP        H09-005626 A        1/1997
JP          H095626 A   *   1/1997    ......... G02B 15/1461
(Continued)

OTHER PUBLICATIONS

Office Action issued Apr. 11, 2023, in Japanese Patent Application No. 2021-566894.
(Continued)

*Primary Examiner* — Bumsuk Won
*Assistant Examiner* — Ray Alexander Dean
(74) *Attorney, Agent, or Firm* — Potomac Law Group, PLLC

(57) ABSTRACT

A variable-power optical system (ZL) is constituted by, in order from the object side and along the optical axis, the following: a first lens group (G1) that has a positive refractive power; a second lens group (G2); a third lens group (G3) that has a negative refractive power; and a rear group (GR) that includes a plurality of lens groups. When power is varied from the wide-angle end to the telephoto end, the interval between the first lens group and the second lens group increases, the interval between the second lens group and the third lens group increases, and the interval between the third lens group and a lens group in the rear group positioned closest to the object decreases, thus satisfying the following conditional equation:

$$0.10 < D1/D2 < 1.80,$$

(Continued)

where

D1 is the length on the optical axis from the lens plane closest to the object of the first lens group to the lens plane closest to the image, and D2 is the length on the optical axis from the lens plane closest to the object of the second lens group to the lens plane closest to the image.

22 Claims, 20 Drawing Sheets

(51) Int. Cl.
  *G02B 13/06*          (2006.01)
  *H04N 23/69*          (2023.01)

(56)                    References Cited

U.S. PATENT DOCUMENTS

| | | | |
|---|---|---|---|
| 5,841,588 A | 11/1998 | Suzuki et al. | |
| 6,266,189 B1 | 7/2001 | Konno et al. | |
| 6,285,502 B1 | 9/2001 | Konno et al. | |
| 2013/0188155 A1* | 7/2013 | Masui | G03B 21/2033 |
| | | | 359/683 |
| 2017/0276917 A1 | 9/2017 | Iwamoto | |

FOREIGN PATENT DOCUMENTS

| | | | | |
|---|---|---|---|---|
| JP | H09-230239 A | | | 9/1997 |
| JP | H09-243919 A | | | 9/1997 |
| JP | 2011-180218 A | | | 9/2011 |
| JP | 2013-101238 A | | | 5/2013 |
| JP | 2013-148812 A | | | 8/2013 |
| JP | 2014081428 A | * | | 5/2014 |
| JP | 2014-109666 A | | | 6/2014 |
| JP | 2015-191008 A | | | 11/2015 |
| JP | 2017-173680 A | | | 9/2017 |

OTHER PUBLICATIONS

Office Action issued Apr. 13, 2023, in Chinese Patent Application No. 202080089273.1.

International Search Report from International Patent Application No. PCT/JP2020/042052, Dec. 22, 2020.

International Preliminary Report on Patentability from International Patent Application No. PCT/JP2020/042052, Jul. 7, 2022.

Office Action issued Nov. 15, 2022, in Japanese Patent Application No. 2021-566894.

* cited by examiner

SPHERICAL ABERRATION ASTIGMATISM DISTORTION

CHROMATIC ABERRATION OF MAGNIFICATION

COMA ABERRATION

SPHERICAL ABERRATION ASTIGMATISM DISTORTION

CHROMATIC ABERRATION OF MAGNIFICATION

COMA ABERRATION

NA=0. 11    Y=21. 70    Y=21. 70

SPHERICAL ABERRATION    ASTIGMATISM    DISTORTION 0. 500    0. 500    5. 000%

CHROMATIC ABERRATION OF MAGNIFICATION 21. 70
15. 10
10. 80
5. 40
0. 0
−0. 100

COMA ABERRATION

−0. 050

NA=0. 08    Y=21. 70    Y=21. 70

SPHERICAL ABERRATION    ASTIGMATISM    DISTORTION 0. 500    0. 500    5. 000%

CHROMATIC ABERRATION OF MAGNIFICATION 21. 70
15. 10
10. 80
5. 40
0. 0
−0. 100

COMA ABERRATION

−0. 050

SPHERICAL ABERRATION    ASTIGMATISM    DISTORTION

CHROMATIC ABERRATION OF MAGNIFICATION

COMA ABERRATION

SPHERICAL ABERRATION    ASTIGMATISM    DISTORTION

CHROMATIC ABERRATION OF MAGNIFICATION

COMA ABERRATION

SPHERICAL ABERRATION     ASTIGMATISM     DISTORTION

COMA ABERRATION

CHROMATIC ABERRATION OF MAGNIFICATION

SPHERICAL ABERRATION     ASTIGMATISM     DISTORTION

COMA ABERRATION

CHROMATIC ABERRATION OF MAGNIFICATION

SPHERICAL ABERRATION    ASTIGMATISM    DISTORTION

COMA ABERRATION

CHROMATIC ABERRATION OF MAGNIFICATION

SPHERICAL ABERRATION    ASTIGMATISM    DISTORTION

COMA ABERRATION

CHROMATIC ABERRATION OF MAGNIFICATION

SPHERICAL ABERRATION

ASTIGMATISM

DISTORTION

COMA ABERRATION

CHROMATIC ABERRATION
OF MAGNIFICATION

SPHERICAL ABERRATION

ASTIGMATISM

DISTORTION

COMA ABERRATION

CHROMATIC ABERRATION
OF MAGNIFICATION

SPHERICAL ABERRATION

ASTIGMATISM

DISTORTION

CHROMATIC ABERRATION OF MAGNIFICATION

COMA ABERRATION

SPHERICAL ABERRATION

ASTIGMATISM

DISTORTION

CHROMATIC ABERRATION OF MAGNIFICATION

COMA ABERRATION

SPHERICAL
ABERRATION

ASTIGMATISM

DISTORTION

CHROMATIC ABERRATION
OF MAGNIFICATION

COMA ABERRATION

SPHERICAL
ABERRATION

ASTIGMATISM

DISTORTION

CHROMATIC ABERRATION
OF MAGNIFICATION

COMA ABERRATION

| SPHERICAL ABERRATION | ASTIGMATISM | DISTORTION |
| --- | --- | --- |

CHROMATIC ABERRATION OF MAGNIFICATION

COMA ABERRATION

| SPHERICAL ABERRATION | ASTIGMATISM | DISTORTION |
| --- | --- | --- |

CHROMATIC ABERRATION OF MAGNIFICATION

COMA ABERRATION

FNO=4.79

SPHERICAL
ABERRATION

Y=21.70

ASTIGMATISM

Y=21.70

DISTORTION

CHROMATIC ABERRATION
OF MAGNIFICATION

COMA ABERRATION

FNO=5.83

SPHERICAL
ABERRATION

Y=21.70

ASTIGMATISM

Y=21.70

DISTORTION

CHROMATIC ABERRATION
OF MAGNIFICATION

COMA ABERRATION

SPHERICAL ABERRATION

ASTIGMATISM

DISTORTION

CHROMATIC ABERRATION OF MAGNIFICATION

COMA ABERRATION

SPHERICAL ABERRATION

ASTIGMATISM

DISTORTION

CHROMATIC ABERRATION OF MAGNIFICATION

COMA ABERRATION

FIG.19

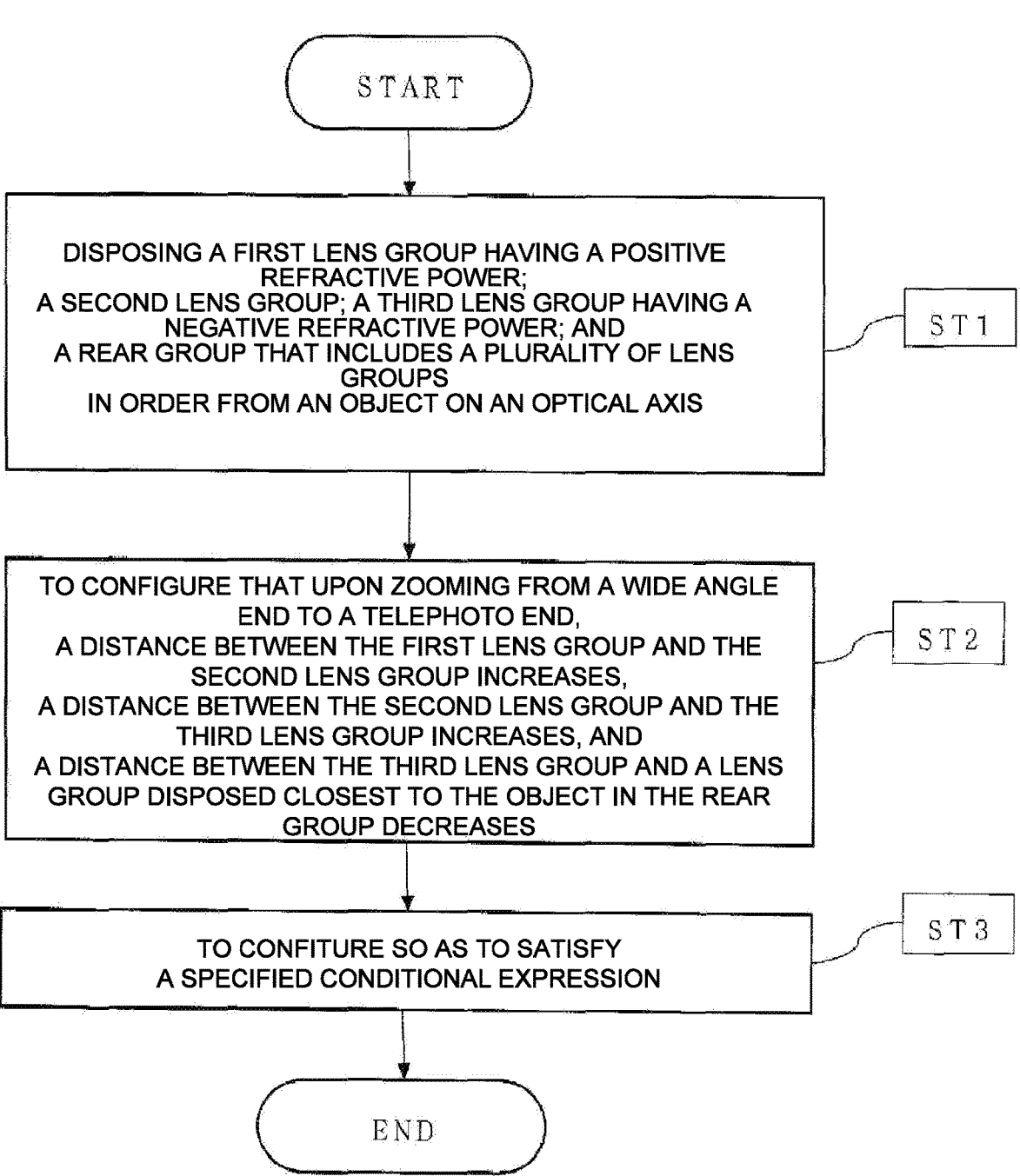

START

DISPOSING A FIRST LENS GROUP HAVING A POSITIVE
REFRACTIVE POWER;
A SECOND LENS GROUP; A THIRD LENS GROUP HAVING A
NEGATIVE REFRACTIVE POWER; AND
A REAR GROUP THAT INCLUDES A PLURALITY OF LENS
GROUPS
IN ORDER FROM AN OBJECT ON AN OPTICAL AXIS

ST1

TO CONFIGURE THAT UPON ZOOMING FROM A WIDE ANGLE
END TO A TELEPHOTO END,
A DISTANCE BETWEEN THE FIRST LENS GROUP AND THE
SECOND LENS GROUP INCREASES,
A DISTANCE BETWEEN THE SECOND LENS GROUP AND THE
THIRD LENS GROUP INCREASES, AND
A DISTANCE BETWEEN THE THIRD LENS GROUP AND A LENS
GROUP DISPOSED CLOSEST TO THE OBJECT IN THE REAR
GROUP DECREASES

ST2

TO CONFITURE SO AS TO SATISFY
A SPECIFIED CONDITIONAL EXPRESSION

ST3

END

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus including the same, and a method for manufacturing the zoom optical system.

TECHNICAL BACKGROUND

Various zoom optical systems having high zooming ratios have conventionally been known. For example, as shown in Patent literature 1, there is what has a configuration achieving a telephoto zoom lens (zoom optical system) with a relatively high zooming ratio by extending the lens group closest to the object toward the object. Unfortunately, in the conventional zoom optical system, a lens having a large aperture is adopted as the lens group that is closest to the object and to be extended toward the object, and the lens group includes multiple lenses, which causes a problem of increase in product weight. Furthermore, there is another problem in that the variation in barycenter position of a camera due to movement of the lens group during zooming is large, and the usability is not so good.

PRIOR ARTS LIST

Patent Document

Patent literature 1: Japanese Laid-open Patent Publication No. 2015-191008(A)

SUMMARY OF THE INVENTION

A zoom optical system according to the present invention consists of, in order from an object on an optical axis: a first lens group having a positive refractive power; a second lens group; a third lens group having a negative refractive power; and a rear group that includes a plurality of lens groups, wherein upon zooming from a wide angle end to a telephoto end, a distance between the first lens group and the second lens group increases, a distance between the second lens group and the third lens group increases, and a distance between the third lens group and a lens group disposed closest to the object in the rear group decreases, and the following conditional expression is satisfied, $$0.10 < D1/D2 < 1.80$$

where
D1: a length on the optical axis from a lens surface closest to the object to a lens surface closest to an image in the first lens group, and
D2: a length on the optical axis from a lens surface closest to the object to a lens surface closest to the image in the second lens group.

An optical apparatus according to the present invention is configured to comprise the zoom optical system described above.

A method for manufacturing a zoom optical system according to the present invention consisting of, in order from an object on an optical axis: a first lens group having a positive refractive power; a second lens group; a third lens group having a negative refractive power; and a rear group that includes a plurality of lens groups, comprises a step of disposing the first lens group, the second lens group, the third lens group and the rear group in a lens barrel in order from an object on an optical axis so that:

upon zooming from a wide angle end to a telephoto end, a distance between the first lens group and the second lens group increases, a distance between the second lens group and the third lens group increases, and a distance between the third lens group and a lens group disposed closest to the object in the rear group decreases, and the following conditional expression is satisfied, $$0.10 < D1/D2 < 1.80$$

where
D1: a length on the optical axis from a lens surface closest to the object to a lens surface closest to an image in the first lens group, and
D2: a length on the optical axis from a lens surface closest to the object to a lens surface closest to the image in the second lens group.

BRIEF DESCRIPTION OF THE DRAWINGS

FIG. 19 is a flowchart showing a method for manufacturing the zoom optical system according to this embodiment.

DESCRIPTION OF THE EMBODIMENTS

Figure 20:
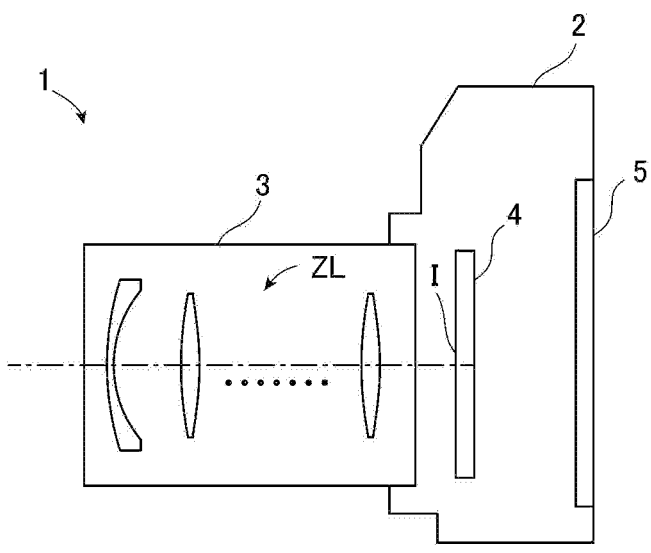
FIG. 20 shows a configuration of a camera that includes the zoom optical system according to this embodiment.

Hereinafter, preferable embodiments according to the present invention are described. First, a camera (optical apparatus) that includes a zoom optical system according to each embodiment is described with reference to FIG. 20. As shown in FIG. 20, this camera 1 includes a main body 2, and a photographing lens 3 attached to the main body 2. The main body 2 includes an imaging element 4, a main body control part (not shown) that controls the operation of the digital camera, and a liquid crystal operation screen 5. The photographing lens 3 includes an optical system ZL that includes a plurality of lens groups, and a lens position control mechanism (not shown) that controls the position of each lens group. The lens position control mechanism includes a sensor that detects the position of each lens group, a motor that moves each lens group forward and backward on the optical axis, and a control circuit that drives the motor.

Light from a photographic subject is condensed by the optical system ZL of the photographing lens 3, and reaches an image surface I of the imaging element 4. The light having reached the image surface I from the photographic subject is photoelectrically converted by the imaging element 4, and is recorded as digital image data in a memory, not shown. The digital image data recorded in the memory is allowed to be displayed on the liquid crystal screen 5 according to an operation by a user. Note that this camera may be a mirrorless camera, or a single-lens reflex camera that includes a quick return mirror.

Next, the zoom optical system (photographing lens 3) according to this embodiment is described. A zoom optical system ZL(1) that is an example of the zoom optical system (zoom lens) ZL according to this embodiment consists of, in order from an object on an optical axis: a first lens group G1 group having a positive refractive power; a second lens group G2; a third lens group G3 having a negative refractive power; and a rear group GR that includes a plurality of lens groups. In this zoom optical system ZL, upon zooming from a wide angle end to a telephoto end, a distance between the first lens group and the second lens group increases, a distance between the second lens group and the third lens group increases, and a distance between the third lens group and a lens group (fourth lens group) disposed closest to the object in the rear group decreases.

Furthermore, the zoom optical system ZL satisfies the following conditional expression (1):

$$0.10 < D1/D2 < 1.80$$

where

D1: a length on the optical axis from a lens surface closest to the object to a lens surface closest to an image in the first lens group, and D2: a length on the optical axis from a lens surface closest to the object to a lens surface closest to the image in the second lens group.

By configuring the zoom optical system as described above, the first lens group G1 that has a positive refractive power and extends toward the object upon zooming can be reduced in weight, and the optical system (entire lens) can be reduced in weight accordingly. The third lens group having a negative refractive power moves toward the object to thereby cancel the barycenter movement, and variation in barycenter position upon zooming can be suppressed accordingly.

The conditional expression (1) defines the ratio of the lengths in the optical axis direction between the first lens group G1 and the second lens group G2. The aforementioned configuration of the zoom optical system is provided, and further the conditional expression (1) is satisfied, which can reduce the weight of glass of the lens groups that extend upon zooming, and reduces the weight of the optical system, while favorably correcting the spherical aberration and the longitudinal chromatic aberration. To further secure the advantageous effects of this embodiment, it is preferable to set the upper limit value of the conditional expression (1) to 1.50, 1.40, 1.20, 1.00, 0.95, 0.90, 0.85, or further to 0.80, for example. It is preferable to set the lower limit value of the conditional expression (1) to 0.15, 0.20, 0.24, 0.27, 0.30, or further to 0.32, for example.

Preferably, in the zoom optical system described above, the first lens group consists of two lenses or less. Accordingly, while the first lens group tends to have a large aperture in a case of a configuration allowing the zoom optical system to be used for telephoto zooming, the number of lenses that tend to have large apertures is reduced, which can reduce the weight of the zoom optical system.

Preferably, in the zoom optical system described above, the second lens group consists of two or more lenses. According to such a configuration, the longitudinal chromatic aberration and the chromatic aberration of magnification can be favorably corrected.

Preferably, in the zoom optical system described above, the third lens group consists of two or more lenses. According to such a configuration, the spherical aberration and the longitudinal chromatic aberration can be favorably corrected.

Preferably, in the zoom optical system described above, the following conditional expression (2) is satisfied, $$0.10 < (-\Delta d1)/TLw < 0.50 \tag{2}$$

where $\Delta d1$: an amount of movement of the first lens group upon zooming from the wide angle end to the telephoto end, TLw: an entire length of the optical system in the wide angle end state, and movement toward an image surface is chosen to be positive.

The conditional expression (2) defines the ratio between the amount of movement of the first lens group G1 upon zooming from the wide angle end to the telephoto end and the entire lengths TLw of the optical systems in the wide angle end state. By satisfying the expression, favorable aberration correction, and reduction in weight of the zoom optical system can be compatibly achieved. If the upper limit value of the conditional expression (2) is exceeded, the entire length of the optical system in the telephoto end becomes large, which causes a problem of increase in total weight. If the lower limit value of the conditional expression (2) is not reached, it becomes difficult to correct the longitudinal chromatic aberration. To further secure the advantageous effects of this embodiment, it is preferable to set the upper limit value of the conditional expression (2) to 0.47, 0.44, 0.42, 0.40, or further to 0.38, for example. It is preferable to set the lower limit value of the conditional expression (2) to 0.12, 0.14, 0.16, 0.18, or further to 0.19, for example.

Preferably, in the zoom optical system described above, the following conditional expression (3) is satisfied, $$|\Delta d2/\Delta d1| < 0.20 \tag{3}$$

where $\Delta d2$: an amount of movement of the second lens group upon zooming from the wide angle end to the telephoto end, and movement toward an image surface is chosen to be positive.

The conditional expression (3) defines the ratio between the amount of movement of the first lens group G1 and the amount of movement of the second lens group G2 upon zooming from the wide angle end to the telephoto end. By satisfying the expression, the second lens group G2 can be prevented from being largely moved, and variation in barycenter position can be suppressed. If the upper limit value of the conditional expression (3) is exceeded, the amount of movement of the second lens group G2 becomes too large, which increases the effect of variation in barycenter position. To further secure the advantageous effects of this embodiment, it is preferable to set the upper limit value of the conditional expression (3) to 0.18, 0.16, 0.14, 0.12, or further to 0.10, for example.

Preferably, in the zoom optical system described above, the following conditional expression (4) is satisfied, $$0.05 < \Delta d3/TLw < 0.25 \tag{4}$$

where $\Delta d3$: an amount of movement of the third lens group upon zooming from the wide angle end to the telephoto end, and movement toward an image surface is chosen to be positive.

The conditional expression (4) defines the ratio between the amount of movement of the third lens group G3 upon zooming from the wide angle end to the telephoto end, and the entire length TLw of the optical system in the wide angle end state. By satisfying the expression, the first lens group G1 moves toward the object upon zooming from the wide angle end to the telephoto end while the third lens group G3 moves toward the image. Accordingly, variation in barycenter position can be suppressed, and the usability is improved. If the upper limit value of the conditional expression (4) is exceeded, correction of the spherical aberration becomes difficult. If the lower limit value is not reached, the movement of the third lens group G3 toward the image becomes small, and it becomes difficult to suppress the variation in barycenter position. To further secure the advantageous effects of this embodiment, it is preferable to set the upper limit value of the conditional expression (4) to 0.23, 0.21, 0.20, 0.19, 0.17, or further to 0.16, for example. It is preferable to set the lower limit value of the conditional expression (4) to 0.60, 0.70, 0.80, 0.85, 0.90, 0.95, or further to 0.10, for example.

Preferably, in the zoom optical system described above, the first to third lens groups G1 to G3 do not move in an optical axis direction upon focusing. Since the first to third lens groups are groups that have large diameters and it is difficult to move the groups quickly, it is defined not to use the groups for focusing. Accordingly, other lens groups that are lightweight and suitable for focusing are used for focusing, and a favorable focusing performance can thus be achieved.

Preferably, in the zoom optical system described above, the following conditional expression (5) is satisfied, $$2\omega w < 36.0° \tag{5}$$

where $2\omega w$: a full angle of view upon focusing on an infinity object in the wide angle end state.

The conditional expression (5) defines the full angle of view upon focusing on an infinity object in the wide angle end state. To further secure the advantageous effects of this embodiment, it is preferable to set the upper limit value of the conditional expression (5) to 30.0°, 28.0°, 27.0°, 26.0°, or further to 25.0°, for example.

Preferably, in the zoom optical system described above, the following conditional expression (6) is satisfied, $$2\omega t < 10.0° \tag{6}$$

where $2\omega t$: a full angle of view upon focusing on an infinity object in the telephoto end state.

The conditional expression (6) defines the full angle of view upon focusing on an infinity object in the telephoto end state. To further secure the advantageous effects of this embodiment, it is preferable to set the upper limit value of the conditional expression (6) to 7.0°, 7.5°, 8.0°, 8.5°, or further to 9.0°, for example.

Preferably, in the zoom optical system described above, the following conditional expression (7) is satisfied, $$0.20 < fw/fL1 < 1.00 \tag{7}$$

where fw: a focal length of the entire zoom optical system in the wide angle end state, and fL1: a focal length of a positive lens closest to the object.

The conditional expression (7) defines the ratio between the focal length of the entire zoom optical system in the wide angle end state, and the focal length of the positive lens closest to the object. By satisfying the expression, the incident light beam is converged by the positive lens closest to the object, and the entire lens diameter can be reduced, which can facilitate reduction in weight. If the upper limit value of the conditional expression (7) is exceeded, the function of converging incident light by the positive lens closest to the object becomes insufficient, and it becomes difficult to reduce the weight. On the other hand, if the lower limit value is not reached, the refractive power of the positive lens closest to the object becomes too large, and it becomes difficult to correct the coma aberration and the like. To further secure the advantageous effects of this embodiment, it is preferable to set the upper limit value of the conditional expression (7) to 0.96, 0.92, 0.90, 0.88, 0.85, 0.83, 0.80, 0.75, or further to 0.70, for example. It is preferable to set the lower limit value of the conditional expression (7) to 0.22, 0.24, 0.25, 0.27, 0.30, or further to 0.31, for example.

Preferably, in the zoom optical system described above, all the lenses constituting the first lens group G1 are lenses having positive refractive powers. Accordingly, the first lens group can be configured to be lightweight, and variation in lens barycenter position during extension upon zooming can be suppressed.

Preferably, in the zoom optical system described above, the following conditional expression (8) is satisfied, $$-1.00 < f1/f2 < 2.00 \tag{8}$$

where f1: a focal length of the first lens group, and f2: a focal length of the second lens group.

The conditional expression (8) defines the ratio of the focal lengths of the first lens group G1 and the second lens group G2. By satisfying the expression, two advantages that are reduction in size and weight and favorable aberration correction can be compatibly achieved. If the upper limit value of the conditional expression (8) is exceeded, the refractive power of the first lens group G1 becomes too strong, and it becomes difficult to correct the coma aberration and the like. If the lower limit value is not reached, the refractive power of the first lens group G1 becomes weak, which causes a problem in increase in size of the optical system. To further secure the advantageous effects of this embodiment, it is preferable to set the upper limit value of the conditional expression (8) to 1.80, 1.60, 1.50, 1.40, 1.20, 1.00, 0.95, or further to, 0.92, for example. It is preferable to set the lower limit value of the conditional expression (8) to −0.80, −0.60, −0.50, −0.45, −0.40, −0.35, −0.30, or further to −0.28, for example.

Preferably, in the zoom optical system described above, the following conditional expression (9) is satisfied, $$0.00 < f1/(-f3) < 1.00 \tag{9}$$

where f3: a focal length of the third lens group.

The conditional expression (9) defines the ratio of the focal lengths of the first lens group G1 and the third lens group G3. By satisfying the expression, two advantages that are reduction in size and weight and favorable aberration correction can be compatibly achieved. If the upper limit value of the conditional expression (9) is exceeded, the refractive power of the second lens group G2 becomes too strong on the positive side, and it becomes difficult to correct the chromatic aberrations and the like. If the lower limit value is not reached, the refractive power of the second lens group G2 becomes too strong on the negative side, and it becomes difficult to correct the chromatic aberrations and the like. To further secure the advantageous effects of this embodiment, it is preferable to set the upper limit value of the conditional expression (9) to 0.90, 0.75, 0.60, 0.50, 0.45, 0.40, 0.35, or further to 0.30, for example. It is preferable to set the lower limit value of the conditional expression (9) to 0.04, 0.07, 0.10, 0.12, or further to 0.14, for example.

Preferably, in the zoom optical system described above, the following conditional expression (10) is satisfied.

$$-0.050 < f3/f2 < 0.500 \tag{10}$$

The conditional expression (10) defines the ratio of the focal lengths of the second lens group G2 and the third lens group G3. By satisfying the expression, two advantages that are reduction in size and weight and favorable aberration correction can be compatibly achieved. If the upper limit value of the conditional expression (10) is exceeded, the refractive power of the third lens group G3 becomes too weak, which causes a problem in increase in weight of the optical system. If the lower limit value is not reached, the refractive power of the third lens group G3 becomes too strong, and it becomes difficult to correct the spherical aberration and the like. To further secure the advantageous effects of this embodiment, it is preferable to set the upper limit value of the conditional expression (10) to 0.450, 0.400, 0.360, 0.320, or 0.280, for example. It is preferable to set the lower limit value of the conditional expression (10) to −0.045, −0.040, −0.035, −0.030, −0.025, −0.020, or −0.016, for example.

Preferably, in the zoom optical system described above, an Abbe number vd2 of at least one lens included in the second lens group satisfies the following conditional expression (11).

$$80.00 < vd2. \tag{11}$$

The conditional expression (11) defines that at least one of the lenses constituting the second lens group G2 has a high Abbe number vd2. By satisfying the conditional expression (11), the chromatic aberrations can be favorably corrected. To further secure the advantageous effects of this embodiment, it is preferable to set the lower limit value of the conditional expression (11) to 81, 82, 84, 86, or 90, for example.

Preferably, in the zoom optical system described above, a final lens group that is included in the rear group and disposed closest to the image is fixed in an optical axis direction upon zooming. Accordingly, the various aberrations including the curvature of field and the chromatic aberration of magnification can be favorably corrected.

Preferably, in the zoom optical system described above, the following conditional expression (12) is satisfied, $$0.10 < fR/fw < 2.00 \tag{12}$$

where fR: a focal length of a final lens group that is included in the rear group and disposed closest to the image.

The conditional expression (12) defines the ratio between the focal length of the final lens group that is included in the rear group and disposed closest to the image, and the focal length of the entire zoom optical system in the wide angle end state. By satisfying the conditional expression (12), the chromatic aberration of magnification and the distortion can be favorably corrected. If the upper limit value of the conditional expression (12) is exceeded, the refractive power of the final lens group becomes too weak, and it becomes difficult to correct the chromatic aberration of magnification and distortion. If the lower limit value is not reached, the refractive power of the final lens group becomes too strong, which causes a problem in that correction becomes excessive. To further secure the advantageous effects of this embodiment, it is preferable to set the upper limit value of the conditional expression (12) to 1.80, 1.70, 1.60, 1.50, 1.40, 1.30, 1.25, or further to 1.20, for example. It is preferable to set the lower limit value of the conditional expression (12) to 0.20, 0.30, 0.40, 0.50, 0.55, 0.60, or further to 0.65, for example.

Preferably, in the zoom optical system described above, the rear group includes, in order from the object: a first focusing lens group; and a second focusing lens group, and the following conditional expression (13) is satisfied, $$0.20 < fF1/fF2 < 2.00 \tag{13}$$

where fF1: a focal length of the first focusing lens group, and fF2: a focal length of the second focusing lens group.

The conditional expression (13) defines the ratio between the focal length of the first focusing lens group and the second focusing lens group included in the rear group. By satisfying the conditional expression (13), the various aberrations including the spherical aberration upon focusing can be favorably corrected. To further secure the advantageous effects of this embodiment, it is preferable to set the upper limit value of the conditional expression (13) to 1.80, 1.60, 1.50, 1.40, 1.30, 1.20, 1.15, 1.10, 1.05, 1.00, or further to 0.95, for example. It is preferable to set the lower limit value of the conditional expression (13) to 0.30, 0.35, 0.40, 0.45, 0.50, or further to 0.55, for example.

Preferably, in the zoom optical system described above, an aperture stop is comprised and the first focusing lens group and the second focusing lens group are each disposed closer to the image than the aperture stop. Accordingly, variation in image magnification upon focusing can be suppressed.

Subsequently, referring to FIG. 19, a method for manufacturing the optical system is schematically described. According to the manufacturing method, first, a first lens group having a positive refractive power, a second lens group, a third lens group having a negative refractive power, and a rear group including a plurality of lens groups, which are disposed in order from an object on the optical axis, are arranged in a lens barrel (step ST1). The configuration is made so that upon zooming from a wide angle end to a telephoto end, a distance between the first lens group and the second lens group increases, a distance between the second lens group and the third lens group increases, and a distance between the third lens group and a lens group (fourth lens group) disposed closest to the object in the rear group decreases (step ST2). The configuration is made so as to satisfy the following conditional expression (step ST3):

$$0.10 < D1/D2 < 1.80$$

where

D1: a length on the optical axis from a lens surface closest to the object to a lens surface closest to an image in the first lens group, and D2: a length on the optical axis from a lens surface closest to the object to a lens surface closest to the image in the second lens group.

The aforementioned zoom optical system according to this embodiment, and the camera (optical apparatus) including the zoom optical system, and the zoom optical system manufactured by the aforementioned manufacturing method can reduce the weight of the first lens group G1 that has a positive refractive power and extends toward the object upon zooming, and reduce the weight of the optical system (entire lens) accordingly. Furthermore, the third lens group having a negative refractive power moves toward the object to thereby cancel the barycenter movement, and variation in barycenter position upon zooming can be suppressed accordingly.

EXAMPLES

Hereinafter, zoom optical systems ZL according to specific examples of the aforementioned embodiment are described with reference to the drawings. FIGS. 1, 4, 7, 10, 13 and 16 are sectional views respectively showing the configurations and the refractive power allocations of zoom optical systems ZL {ZL(1) to ZL(6)} according to the first to sixth examples. In each sectional view, the moving direction of each lens group on the optical axis upon zooming from the wide angle end state (W) to the telephoto end state (T) is indicated by an arrow. Furthermore, the moving direction of the focusing lens group upon focusing from infinity to a short distance object is indicated by an arrow accompanied by characters "FOCUSING".

In these diagrams (FIGS. 1, 4, 7, 10, 13 and 16), each lens group is represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently on an example-by-example basis. Accordingly, even when the same combination of a symbol and a numeral is used among examples, such usage does not necessarily mean the same configuration.

FIGS. 2A and 2B and FIGS. 3A and 3B, FIGS. 5A and 5B and 6A and 6B, FIGS. 8A and 8B and FIGS. 9A and 9B, FIGS. 11A and 11B and FIGS. 12A and 12B, FIGS. 14A and 14B and FIGS. 15A and 15B, and FIGS. 17A and 17B and FIGS. 18A and 18B show various aberrations of the zoom optical systems ZL(1) to ZL(6) according to the first to sixth examples. In these diagrams, FNO indicates the f-number, NA indicates the numerical aperture, and Y indicates the image height. The spherical aberration graph indicates the value of the f-number or the numerical aperture that corresponds to the maximum aperture. The astigmatism graph and the distortion graph each indicate the maximum value of the image height. The coma aberration graph indicates the value of the corresponding image height. The symbol d indicates d-line ($\lambda$=587.6 nm). The symbol g indicates g-line ($\lambda$=435.8 nm). In the astigmatism graph, a solid line indicates a sagittal image surface, and a broken line indicates a meridional image surface. The distortion graph shows the distortion with reference to d-line. The graph of chromatic aberration of magnification shows the chromatic aberration of magnification with reference to g-line.

Hereinafter, Tables 1 to 6 are shown. Among these tables, Table 1 is a table showing each data item in the first example, Table 2 is that in the second example, Table 3 is that in the third example, Table 4 is that in the fourth example, Table 5 is that in the fifth example, and Table 6 is that in the sixth example. In each example, as targets of calculation of aberration characteristics, d-line (wavelength $\lambda$=587.6 nm), and g-line (wavelength $\lambda$=435.8 nm) are selected.

In the table of [General Data], FNO indicates the f-number, and 2$\omega$ indicates the angle of view (the unit is ° (degrees), and $\omega$ indicates the half angle of view). TL indicates a distance obtained by adding the back focus Bf to the distance on the optical axis from the lens foremost surface to the lens last surface. Bf indicates the air equivalent distance (back focus) on the optical axis from the lens last surface to the image surface I upon focusing on infinity. Note that these values are indicated for corresponding zoom states at the wide angle end (W), the intermediate focal length (M), and the telephoto end (T).

In the table of [Lens Data], Surface Number (the number of the field indicated by characters of Surface) indicates the order of the optical surface from the object side along the direction in which the ray travels, R indicates the radius of curvature (the surface whose center of curvature resides on the image side is regarded to have a positive value) of each optical surface, D indicates the surface distance on the optical axis from each optical surface to the next optical surface (or the image surface), nd is the refractive index of the material of the optical member for d-line, and vd indicates the Abbe number of the material of the optical member with reference to d-line. The radius of curvature "∞" indicates a plane or an opening. (Aperture stop S) indicates an aperture stop. The description of the air refractive index nd=1.00000 is omitted.

The table of [Lens Group Data] shows the first surface (the surface closest to the object) of each lens group, and the focal length of the corresponding lens group.

The table of [Variable Distance Data] shows the surface distance at each surface number where the surface distance is "Variable" in the table showing [Lens Data]. Here, for cases of focusing on infinity and a short distance, the surface distances in each of zooming states at the wide angle end (W), the intermediate focal length (M) and the telephoto end (T) are shown in a manner classified into a case of focusing at a normal distance and a case of focusing at a short distance. Note that the first row indicates the entire focal length f (the case of focusing at a normal distance) or the lateral magnification β (the case of focusing at a short distance) in each zooming state.

The table [Each group magnification] shows the lateral magnification β of each lens group, in each of zooming states at the wide angle end (W), the intermediate focal length (M) and the telephoto end (T), in a manner classified into a case of focusing at a normal distance and a case of short distance.

The table of [Other data] shows the lengths D1 and D2 on the optical axis from the lens surface closest to the object to the lens surface closest to the image in the first and second lens groups, the amounts of movement Δd1, Δd2 and Δd3 of the first, second and third lens groups upon zooming from the wide angle end to the telephoto end, the focal length fL1 of the positive lens closest to the object, the focal length fR of the final lens group that is included in the rear group and disposed closest to the image, and the focal lengths fF1 and fF2 of the first and second focusing lens groups.

Tables of [Conditional Expression Corresponding Value] are provided at the end of the description of every example (first to sixth examples). This table collectively indicates values corresponding to the conditional expressions with respect to all the examples (first to sixth examples).

Hereinafter, at all the data values, the listed focal length f, radius of curvature R, surface distance D, other lengths and the like are generally represented in "mm" if not otherwise specified. However, even after subjected to proportional scaling in or out, the optical system can achieve equivalent optical performances. Accordingly, the representation is not limited thereto.

The descriptions of the tables so far are common to all the examples. Redundant descriptions are hereinafter omitted.

First Example

Figure 1:
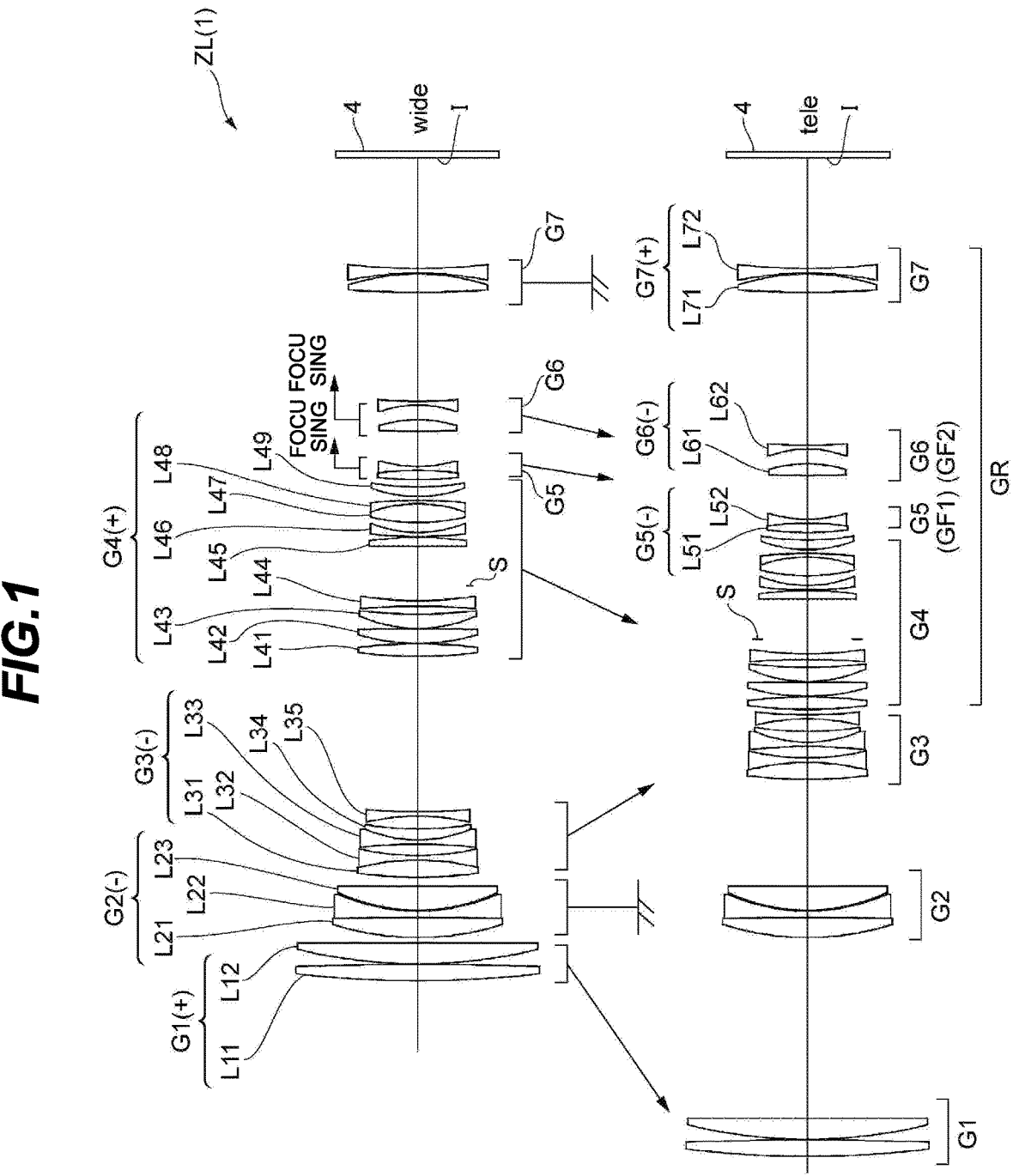
FIG. 1 shows a lens configuration of a zoom optical system according to a first example.

A first example is described with reference to FIGS. 1 to 3A and 3B and Table 1. FIG. 1 is a lens configuration diagram of a zoom optical system according to the first example. The zoom optical system ZL(1) according to the first example consists of, in order from the object: a first lens group G1 having a positive refractive power; a second lens group G2 having a negative refractive power; a third lens group G3 having a negative refractive power; a fourth lens group G4 having a positive refractive power; an aperture stop S disposed in the fourth lens group G4; a fifth lens group G5 having a negative refractive power; a sixth lens group G6 having a negative refractive power; and a seventh lens group G7 having a positive refractive power. Note that an imaging element 4 that includes an image surface I is disposed on the image-side of the seventh lens group G7.

Upon zooming from the wide angle end state (W) to the telephoto end state (T), the first lens group G1, and the third to sixth lens groups G3 to G6 move in the optical axis direction as indicated by arrows in FIG. 1, and the distances between lens groups adjacent to each other change. Note that the second and seventh lens groups G2 and G7 are fixed and stationary upon zooming. Note that the lens group that consists of the fourth to seventh lens groups G4 to G7 corresponds to the rear group GR. A sign (+) or (−) assigned to each lens group symbol indicates the refractive power of the corresponding lens group. This indication similarly applies to all the following examples.

The first lens group G1 consists of, in order from the object: a biconvex positive lens L11; and a convexo-plane-shaped positive lens L12 that includes an object-side surface as a convex surface facing the object, and an image-side surface as a planar surface.

The second lens group G2 consists of, in order from the object: a cemented lens including a biconvex positive lens L21, and a biconcave negative lens L22; and a biconvex positive lens L23.

The third lens group G3 consists of, in order from the object: a cemented lens including a biconvex positive lens L31, and a biconcave negative lens L32; a cemented lens including a biconcave negative lens L33, and a positive meniscus lens L34 having a convex surface facing the object; and a biconcave negative lens L35.

The fourth lens group G4 consists of, in order from the object: a biconvex positive lens L41; a biconvex positive lens L42; a positive meniscus lens L43 having a convex surface facing the object; a biconcave negative lens L44; an aperture stop S; a biconvex positive lens L45; a negative meniscus lens L46 having a convex surface facing the object; a cemented lens including a biconvex positive lens L47, and a negative meniscus lens L48 having a concave surface facing the object; and a positive meniscus lens L49 having a convex surface facing the object. Note that the cemented lens including the positive lens L47 and the negative meniscus lens L48 is a vibration proof lens controlled to move perpendicular to the optical axis. Camera shake correction and the like are performed by this lens.

The fifth lens group G5 consists of, in order from the object, a cemented lens including a biconvex positive lens L51 and a biconcave negative lens L52. The fifth lens group G5 constitutes a first focusing lens group GF1 that is moved upon focusing.

The sixth lens group G6 consists of a biconvex positive lens L61, and a biconcave negative lens L62. The sixth lens group G6 constitutes a second focusing lens group GF2 that is moved upon focusing.

The seventh lens group G7 consists of, in order from the object: a biconvex positive lens L71; and a biconcave negative lens L72.

In this example, as described above, the fifth lens group G5 constitutes the first focusing lens group GF1, and the sixth lens group G6 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 1 lists values of data on the zoom optical system according to the first example.

TABLE 1

| [General Data] | | | |
|---|---|---|---|
| | W | M | T |
| Entire Focal length f | 103.00 | 200.00 | 387.99 |
| Fno. | 4.60 | 5.00 | 5.83 |
| 2ω | 24.00 | 12.20 | 61.00 |
| Entire Length TL | 232.05 | 265.48 | 281.55 |
| Bf | 31.20 | 31.20 | 31.20 |

| [Lens Data] | | | |
|---|---|---|---|
| Surface | R | D | nd | νd |
| 1) | 294.7249 | 4.600 | 1.48749 | 70.31 |
| 2) | −1000.0000 | 0.150 | | |
| 3) | 141.5731 | 5.900 | 1.43385 | 95.25 |
| 4) | 0.0000 | (d1) | Variable | |
| 5) | 80.5202 | 5.700 | 1.49782 | 82.57 |
| 6) | −1012.9343 | 1.800 | 1.83400 | 37.18 |
| 7) | 57.2316 | 0.200 | | |
| 8) | 53.8652 | 6.800 | 1.43700 | 95.00 |
| 9) | −5797.7083 | (d2) | Variable | |
| 10) | 130.2730 | 4.800 | 1.72047 | 34.71 |
| 11) | −69.0469 | 1.300 | 1.49782 | 82.57 |
| 12) | 72.3815 | 3.194 | | |
| 13) | −153.7759 | 1.200 | 1.65160 | 58.62 |
| 14) | 38.0000 | 3.100 | 1.85478 | 24.80 |
| 15) | 90.1995 | 3.588 | | |
| 16) | −63.7942 | 1.200 | 1.75500 | 52.34 |
| 17) | 157.6117 | (d3) | Variable | |
| 18) | 129.1207 | 3.500 | 1.59319 | 67.90 |
| 19) | −140.7152 | 0.150 | | |
| 20) | 60.0694 | 4.000 | 1.49782 | 82.57 |
| 21) | −1651.5770 | 0.150 | | |
| 22) | 39.8879 | 4.100 | 1.49782 | 82.57 |
| 23) | 163.2683 | 2.145 | | |
| 24) | −220.5817 | 1.600 | 1.95375 | 32.33 |
| 25) | 106.9215 | 4.078 | | |
| 26) | ∞ | 11.253 | Aperture stop | |
| 27) | 4136.1631 | 2.463 | 1.85478 | 24.80 |
| 28) | −99.1304 | 0.200 | | |
| 29) | 114.5157 | 1.200 | 1.95375 | 32.33 |
| 30) | 35.7902 | 2.748 | | |
| 31) | 57.1849 | 5.300 | 1.61272 | 58.54 |
| 32) | −38.4615 | 1.000 | 1.80100 | 34.92 |
| 33) | −115.9224 | 1.000 | | |
| 34) | 37.5625 | 2.800 | 1.69680 | 55.52 |
| 35) | 86.8987 | (d4) | Variable | |
| 36) | 98.0479 | 2.600 | 1.80610 | 33.34 |
| 37) | −83.3333 | 1.100 | 1.76385 | 48.49 |
| 38) | 37.9496 | (d5) | Variable | |
| 39) | 266.0993 | 3.300 | 1.54814 | 45.51 |
| 40) | −38.2062 | 4.120 | | |
| 41) | −32.0966 | 1.100 | 1.76385 | 48.49 |
| 42) | 153.7540 | (d6) | Variable | |
| 43) | 300.8153 | 5.156 | 1.67300 | 38.15 |
| 44) | −65.2552 | 0.200 | | |
| 45) | −101.2915 | 1.400 | 1.5186 | 69.89 |
| 46) | 200.0000 | 31.205 | BF | |
| Image Surface (I) | ∞ | | | |

| [Lens Group Data] | | |
|---|---|---|
| Group | First surface | Focal length |
| f1 | 1 | 192.882 |
| f2 | 5 | −3076.438 |
| f3 | 10 | −44.260 |
| f4 | 18 | 46.122 |
| f5 | 36 | −90.434 |
| f6 | 39 | −96.365 |
| f7 | 43 | 205.898 |

TABLE 1-continued

| | W infinity | M infinity | T infinity | W vicinity | M vicinity | T vicinity |
|---|---|---|---|---|---|---|
| | | | [Variable Distance Data] | | | |
| f(β) | 102.99983 | 199.99921 | 387.99209 | −0.12360 | −0.21443 | −0.37546 |
| (d1) | 1.50000 | 34.93259 | 51.00000 | 1.50000 | 34.93259 | 51.0000 |
| (d2) | 2.48427 | 18.46128 | 29.95595 | 2.48427 | 18.46128 | 29.95595 |
| (d3) | 43.90944 | 24.14038 | 1.50000 | 43.90944 | 24.14038 | 1.5000 |
| (d4) | 2.14279 | 5.90020 | 2.11356 | 2.90132 | 13.81733 | 33.11385 |
| (d5) | 9.85398 | 3.84270 | 12.42643 | 17.52266 | 8.74733 | 11.10598 |
| (d6) | 30.76333 | 36.80909 | 43.15893 | 22.33633 | 23.98726 | 13.48202 |
| | | | [Each Group Magnification] | | | |
| G1 | 0.00000 | 0.00000 | 0.00000 | −0.34636 | −0.36854 | −0.37928 |
| G2 | 1.03180 | 1.02036 | 1.01495 | 1.05545 | 1.04500 | 1.04005 |
| G3 | −0.38086 | −0.68055 | −1.19939 | −0.23423 | −0.31428 | −0.38782 |
| G4 | −0.57285 | −0.62320 | −0.62049 | −0.62308 | −0.79801 | −1.20075 |
| G5 | 1.68587 | 1.64195 | 1.75887 | 1.73630 | 1.64628 | 1.62495 |
| G6 | 1.69072 | 1.75343 | 1.81932 | 1.60329 | 1.62038 | 1.51141 |
| G7 | 0.83223 | 0.83224 | 0.83224 | 0.83223 | 0.83224 | 0.83223 |

| [Other Data] | |
|---|---|
| D1 | 10.65 |
| D2 | 14.50 |
| Δd1 | −49.499 |
| Δd2 | 0.000 |
| Δd3 | 27.473 |
| fL1 | 467.498 |
| fR | 205.898 |
| fF1 | −90.434 |
| fF2 | −96.365 |

Figure 2A:
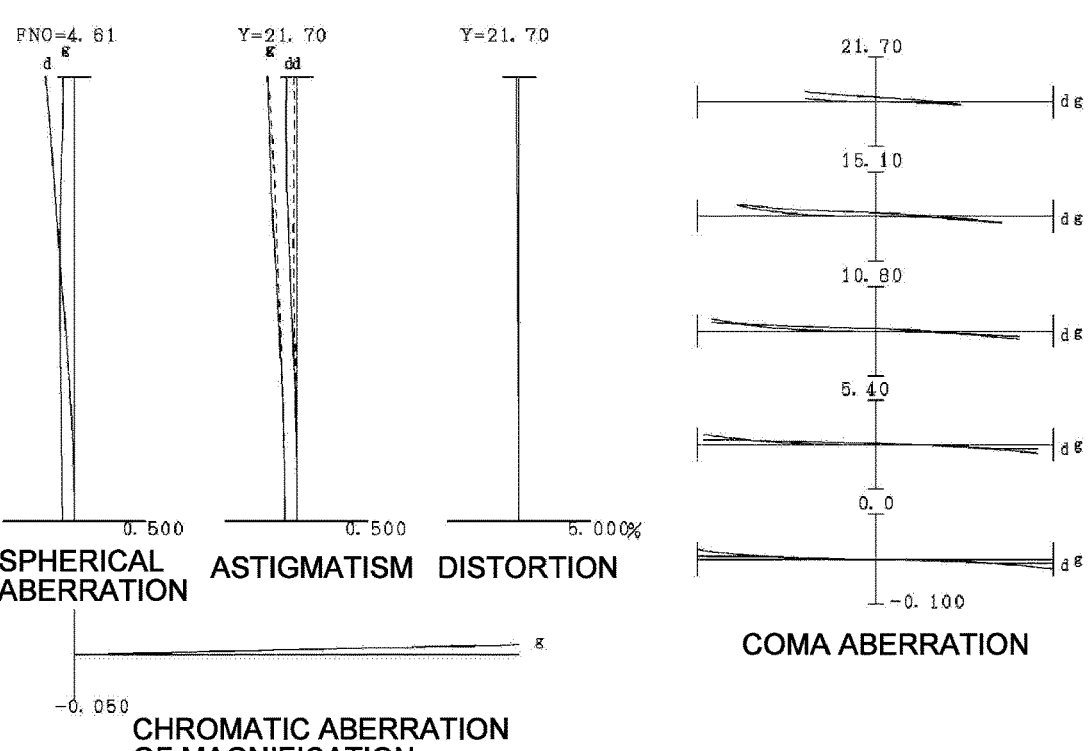
FIGS. 2A and 2B are graphs respectively showing various aberrations of the zoom optical system according to the first example upon focusing on infinity in a wide angle end state and a telephoto end state.
Figure 2B:
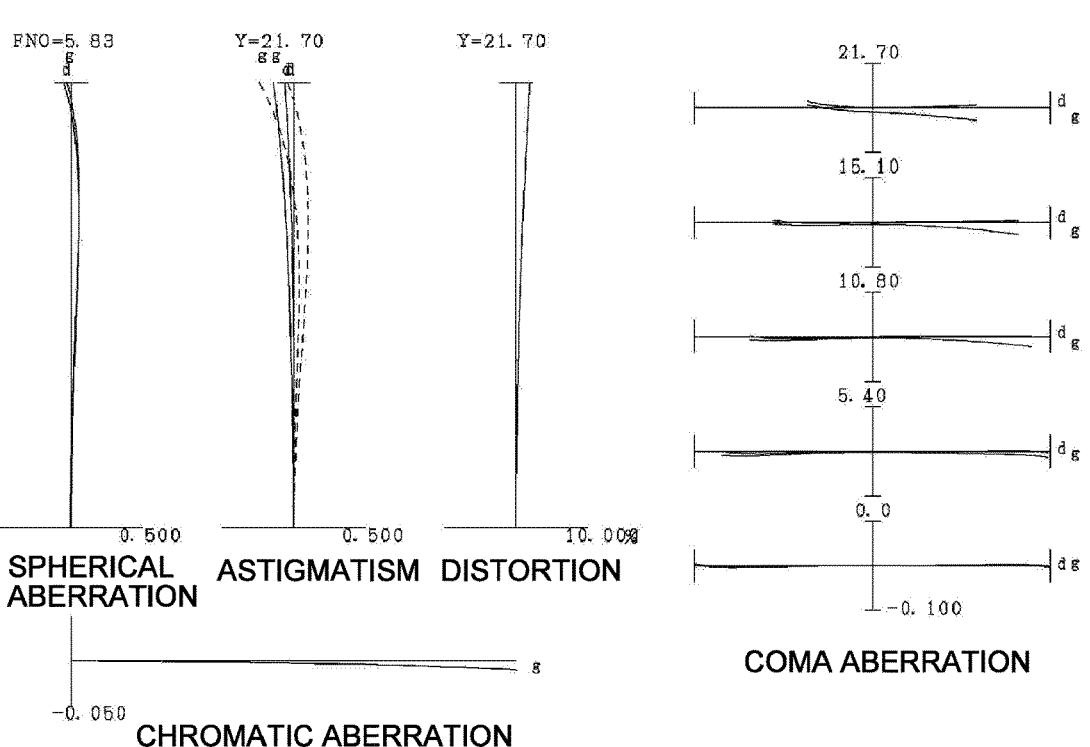
Figure 3A:
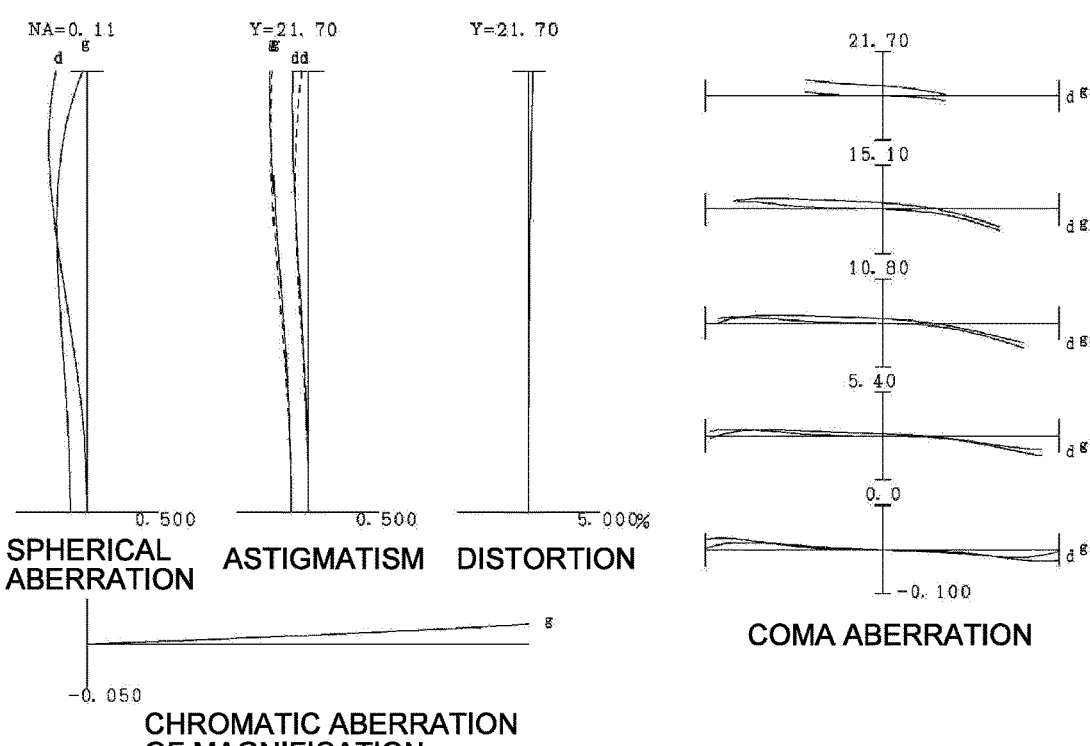
FIGS. 3A and 3B are graphs respectively showing various aberrations of the zoom optical system according to the first example upon focusing on a short distance object in the wide angle end state and the telephoto end state.
Figure 3B:
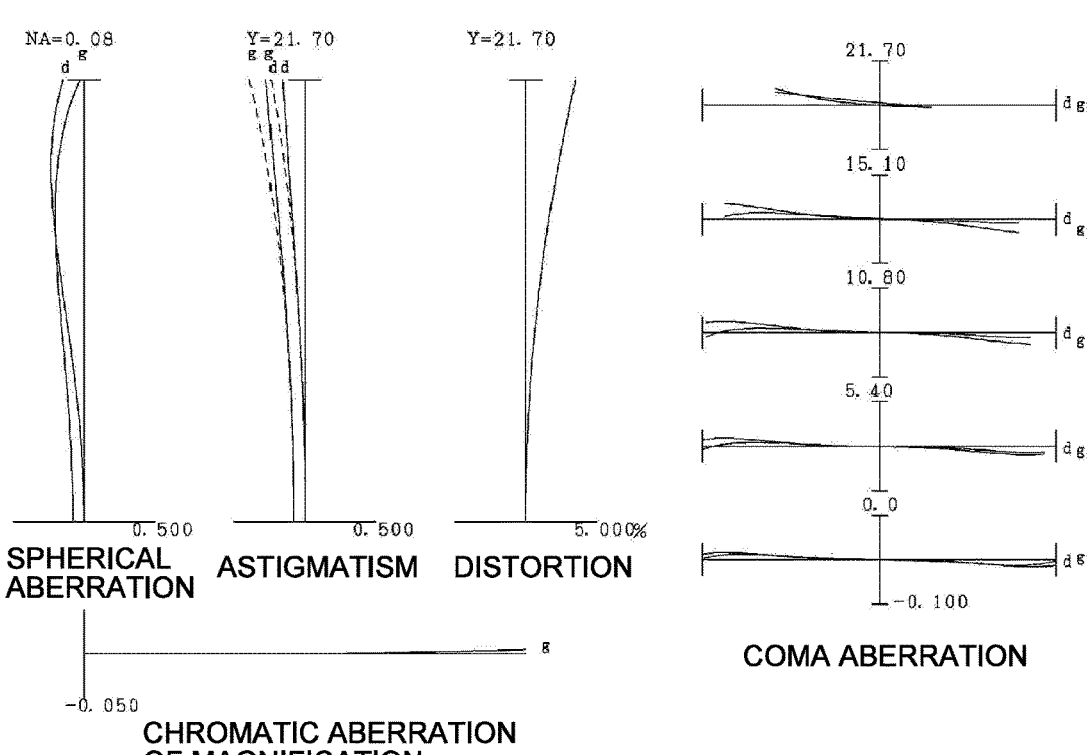

FIGS. 2A and 2B are graphs respectively showing various aberrations of the zoom optical system according to the first example upon focusing on infinity in a wide angle end state and a telephoto end state. FIGS. 3A and 3B are graphs respectively showing various aberrations of the zoom optical system according to the first example upon focusing on a short distance object in the wide angle end state and the telephoto end state.

In each of the graphs of FIGS. 2A and 2B, FNO indicates the f-number, and Y indicates the image height. The spherical aberration graph indicates the value of the f-number corresponding to the maximum diameter. The astigmatism graph and the distortion graph each indicate the maximum value of the image height. The lateral aberration graph indicates the value of the corresponding image height. In each of the graphs of FIGS. 3A and 3B, NA indicates the numerical aperture, and Y indicates the image height. The spherical aberration graph indicates the value of the numerical aperture corresponding to the maximum diameter. The astigmatism graph and the distortion graph each indicate the maximum value of the image height. The coma aberration graph indicates the value of the corresponding image height. In each aberration graph, the symbol d indicates d-line (wavelength λ=587.6 nm). The symbol g indicates g-line (wavelength λ=435.8 nm). In the astigmatism graph, a solid line indicates a sagittal image surface, and a broken line indicates a meridional image surface. Note that also in the following aberration graphs in each example, symbols similar to those in this example are used, and redundant description is omitted.

The graphs showing various aberrations exhibit that the zoom optical system according to the first example favorably corrects various aberrations and has an excellent imaging performance from the wide angle end state to the telephoto end state, and further has an excellent imaging performance also upon focusing on the short distance object.

Second Example

Figure 4:
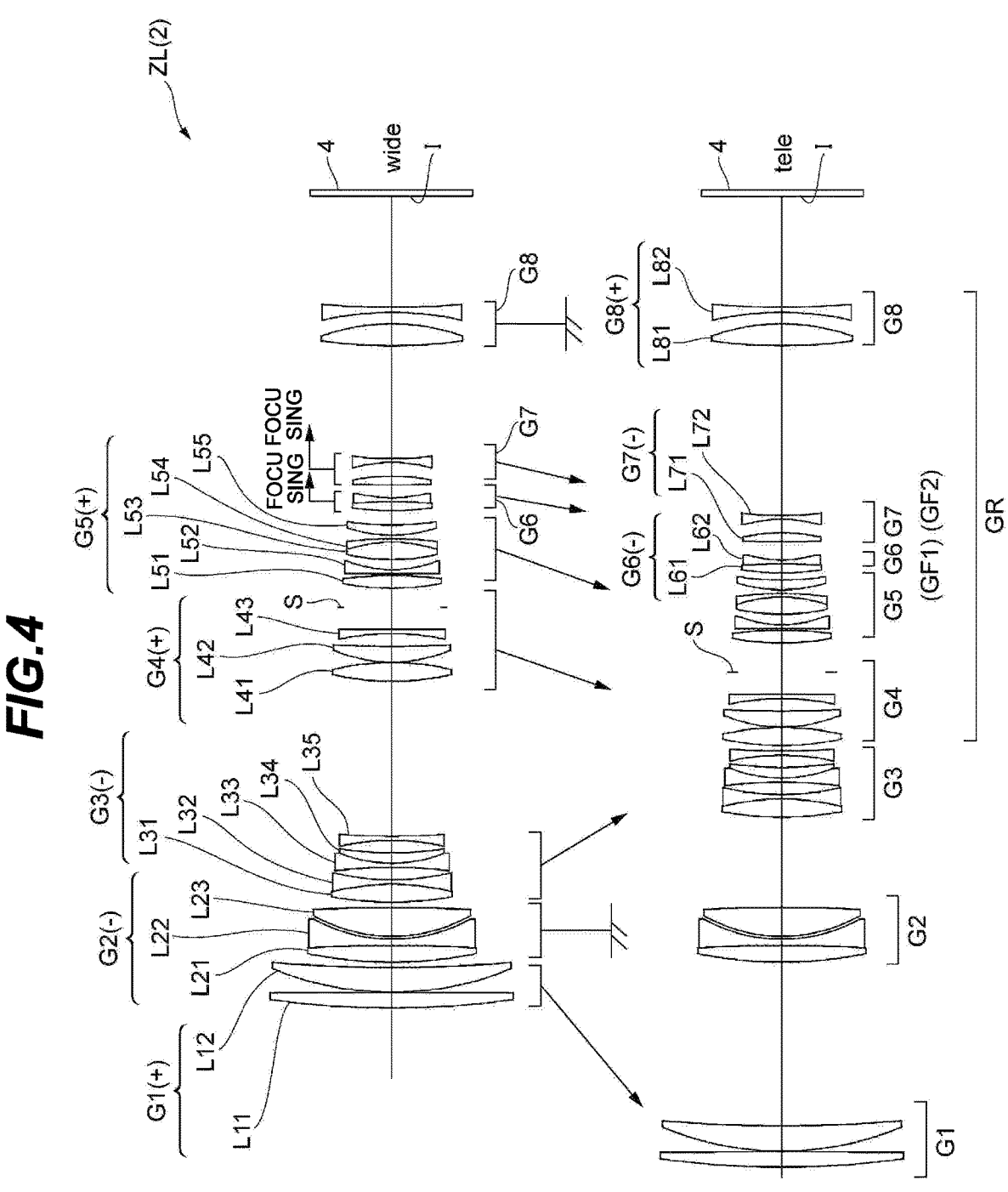
FIG. 4 shows a lens configuration of a zoom optical system according to a second example.

A second example is described with reference to FIGS. 4 to 6A and 6B and Table 2. FIG. 4 is a lens configuration diagram of a zoom optical system according to the second example. The zoom optical system ZL(2) according to the second example consists of, in order from the object: a first lens group G1 having a positive refractive power; a second lens group G2 having a negative refractive power; a third lens group G3 having a negative refractive power; a fourth lens group G4 having a positive refractive power; an aperture stop S; a fifth lens group G5 having a positive refractive power; a sixth lens group G6 having a negative refractive power; a seventh lens group G7 having a negative refractive power; and an eighth lens group G8 having a positive refractive power. Note that an imaging element 4 that includes an image surface I is disposed on the image-side of the eighth lens group G8.

Upon zooming from the wide angle end state (W) to the telephoto end state (T), the first lens group G1, and the third to seventh lens groups G3 to G7 move in the axial direction as indicated by arrows in FIG. 4, and the distances between lens groups adjacent to each other change. Note that the second and eighth lens groups G2 and G8 are fixed and stationary upon zooming. Note that the lens group that consists of the fourth to eighth lens groups G4 to G8 corresponds to the rear group GR.

The first lens group G1 consists of, in order from the object: a biconvex positive lens L11; and a positive meniscus lens L12 having a convex surface facing the object.

The second lens group G2 consists of, in order from the object: a cemented lens including a biconvex positive lens L21, and a biconcave negative lens L22; and a biconvex positive lens L23.

The third lens group G3 consists of, in order from the object: a cemented lens including a biconvex positive lens L31, and a biconcave negative lens L32; a cemented lens including a biconcave negative lens L33, and a positive meniscus lens L34 having a convex surface facing the object; and a biconcave negative lens L35.

The fourth lens group G4 consists of, in order from the object: a biconvex positive lens L41; a positive meniscus lens L42 having a convex surface facing the object; a negative meniscus lens L43 having a concave surface facing the object; and an aperture stop S. The aperture stop S is provided on the image-side of the fourth lens group G4, and moves with the fourth lens group G4 upon zooming.

The fifth lens group G5 consists of, in order from the object: a biconvex positive lens L51; a negative meniscus lens L52 having a convex surface facing an object; a cemented lens including a biconvex positive lens L53 and a negative meniscus lens L54 having a concave surface facing the object; and a positive meniscus lens L55 having a convex surface facing the object. Note that the cemented lens including the positive lens L53 and the negative meniscus lens L54 is a vibration proof lens controlled to move perpendicular to the optical axis. Camera shake correction and the like are performed by this lens.

The sixth lens group G6 consists of a cemented lens including a biconvex positive lens L61 and a biconcave negative lens L62. The sixth lens group G6 constitutes a first focusing lens group GF1 that is moved upon focusing.

The seventh lens group G7 consists of, in order from the object: a biconvex positive lens L71; and a biconcave negative lens L72. The seventh lens group G7 constitutes a second focusing lens group GF2 that is moved upon focusing.

The eighth lens group G8 consists of, in order from the object: a biconvex positive lens L81; and a biconcave negative lens L82.

In this example, as described above, the sixth lens group G6 constitutes the first focusing lens group GF1, and the seventh lens group G7 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 2 lists values of data on the zoom optical system according to the second example.

TABLE 2

| [General Data] | | | |
|---|---|---|---|
| | W | M | T |
| Entire Focal length f | 103.00 | 200.00 | 387.97 |
| Fno. | 4.62 | 5.07 | 5.83 |
| 2ω | 24.00 | 12.20 | 61.00 |
| Entire Length TL | 232.05 | 261.04 | 275.05 |
| Bf | 31.50 | 31.50 | 31.50 |

| [Lens Data] | | | | |
|---|---|---|---|---|
| Surface | R | D | nd | νd |
| 1) | 254.5101 | 4.350 | 1.48749 | 70.31 |
| 2) | −4661.3201 | 0.150 | | |
| 3) | 88.4110 | 7.050 | 1.43385 | 95.25 |
| 4) | 400.7827 | (d1) | Variable | |
| 5) | 116.1000 | 4.700 | 1.66382 | 27.35 |
| 6) | −419.0650 | 1.800 | 1.79504 | 28.69 |
| 7) | 46.0318 | 0.823 | | |
| 8) | 44.9547 | 8.100 | 1.43385 | 95.25 |
| 9) | −480.0222 | (d2) | Variable | |
| 10) | 92.7373 | 5.100 | 1.73800 | 32.26 |
| 11) | −69.3366 | 1.300 | 1.59319 | 67.90 |
| 12) | 71.8114 | 3.466 | | |
| 13) | −140.3535 | 1.200 | 1.69680 | 55.52 |
| 14) | 40.4618 | 2.954 | 1.85478 | 24.80 |
| 15) | 100.3758 | 3.486 | | |
| 16) | −63.7973 | 1.200 | 1.75500 | 52.34 |
| 17) | 234.6595 | (d3) | Variable | |
| 18) | 72.3324 | 5.300 | 1.59319 | 67.90 |
| 19) | −73.8019 | 0.150 | | |
| 20) | 42.6484 | 4.500 | 1.49782 | 82.57 |
| 21) | 431.3957 | 3.509 | | |
| 22) | −72.0238 | 1.300 | 2.00100 | 29.12 |
| 23) | −4687.4044 | 6.159 | | |
| 24) | 0.0000 | (d4) | Variable | Aperture stop S |
| 25) | 71.8427 | 3.621 | 1.85478 | 24.80 |
| 26) | −106.9091 | 0.399 | | |
| 27) | 5385.8199 | 1.200 | 2.00069 | 25.46 |
| 28) | 33.8729 | 2.886 | | |
| 29) | 57.6879 | 4.900 | 1.63854 | 55.34 |
| 30) | −39.0854 | 1.000 | 1.90366 | 31.27 |

TABLE 2-continued

| | | | | |
|---|---|---|---|---|
| 31) | −96.1148 | 1.000 | | |
| 32) | 40.0604 | 2.800 | 1.72825 | 28.38 |
| 33) | 79.7455 | (d5) | Variable | |
| 34) | 85.7638 | 2.500 | 1.85026 | 32.35 |
| 35) | −165.1788 | 1.100 | 1.76385 | 48.49 |
| 36) | 33.7179 | (d6) | Variable | |
| 37) | 444.8513 | 2.500 | 1.72342 | 38.03 |
| 38) | −50.4431 | 3.854 | | |
| 39) | −38.9881 | 1.100 | 1.76385 | 48.49 |
| 40) | 100.0000 | (d7) | Variable | |
| 41) | 143.1093 | 6.156 | 1.57957 | 53.74 |
| 42) | −60.5733 | 3.433 | | |
| 43) | −86.3987 | 1.400 | 1.59349 | 67.00 |
| 44) | 222.7374 | 31.497 | | |
| Image Surface (I) | ∞ | | | |

[Lens Group Data]

| Group | First surface | Focal length |
|---|---|---|
| f1 | 1 | 170.700 |
| f2 | 5 | −950.061 |
| f3 | 10 | −45.239 |
| f4 | 18 | 64.817 |
| f5 | 25 | 70.591 |
| f6 | 34 | −84.939 |
| f7 | 37 | −104.473 |
| f8 | 41 | 220.221 |

| | W infinity | M infinity | T infinity | W vicinity | M vicinity | T vicinity |
|---|---|---|---|---|---|---|
| | | | [Variable Distance Data] | | | |
| f(β) | 102.99938 | 199.99617 | 387.97105 | −0.12458 | −0.21808 | −0.39531 |
| (d1) | 1.50000 | 32.48957 | 46.50401 | 1.50000 | 32.48957 | 46.50401 |
| (d2) | 1.50000 | 17.04310 | 25.56630 | 1.50000 | 17.04310 | 25.56630 |
| (d3) | 43.89766 | 26.47342 | 1.50000 | 43.89766 | 26.47342 | 1.50000 |
| (d4) | 5.39936 | 2.02596 | 8.22461 | 5.39936 | 2.02596 | 8.22461 |
| (d5) | 4.09244 | 4.40192 | 2.07438 | 4.99554 | 10.76354 | 33.81074 |
| (d6) | 3.86242 | 3.56442 | 5.13972 | 11.19555 | 14.17497 | 4.26214 |
| (d7) | 31.85464 | 37.09707 | 48.10496 | 23.61780 | 20.12431 | 17.25032 |
| | | | [Each Group Magnification] | | | |
| G1 | 0.00000 | 0.00000 | 0.00000 | −0.29395 | −0.31063 | −0.31771 |
| G2 | 1.18881 | 1.14443 | 1.12543 | 1.26845 | 1.22252 | 1.20270 |
| G3 | −0.37943 | −0.73530 | −1.29435 | −0.23212 | −0.33335 | −0.41750 |
| G4 | −1.75685 | −1.82230 | −1.80618 | −2.14414 | −3.72832 | 17.13880 |
| G5 | 0.32657 | 0.31546 | 0.32601 | 0.29259 | 0.20325 | −0.06979 |
| G6 | 1.70275 | 1.71912 | 1.77601 | 1.75538 | 1.77514 | 1.64540 |
| G7 | 1.73596 | 1.78608 | 1.89139 | 1.65713 | 1.62364 | 1.59616 |
| G8 | 0.78878 | 0.78880 | 0.78882 | 0.78878 | 0.78879 | 0.78879 |

[Other Data]

| | |
|---|---|
| D1 | 11.550 |
| D2 | 15.423 |
| Δd1 | −44.999 |
| Δd2 | 0.000 |
| Δd3 | 24.071 |
| fL1 | 495.196 |
| fR | 220.221 |
| fF1 | −84.939 |
| fF2 | −104.473 |

Figure 5A:
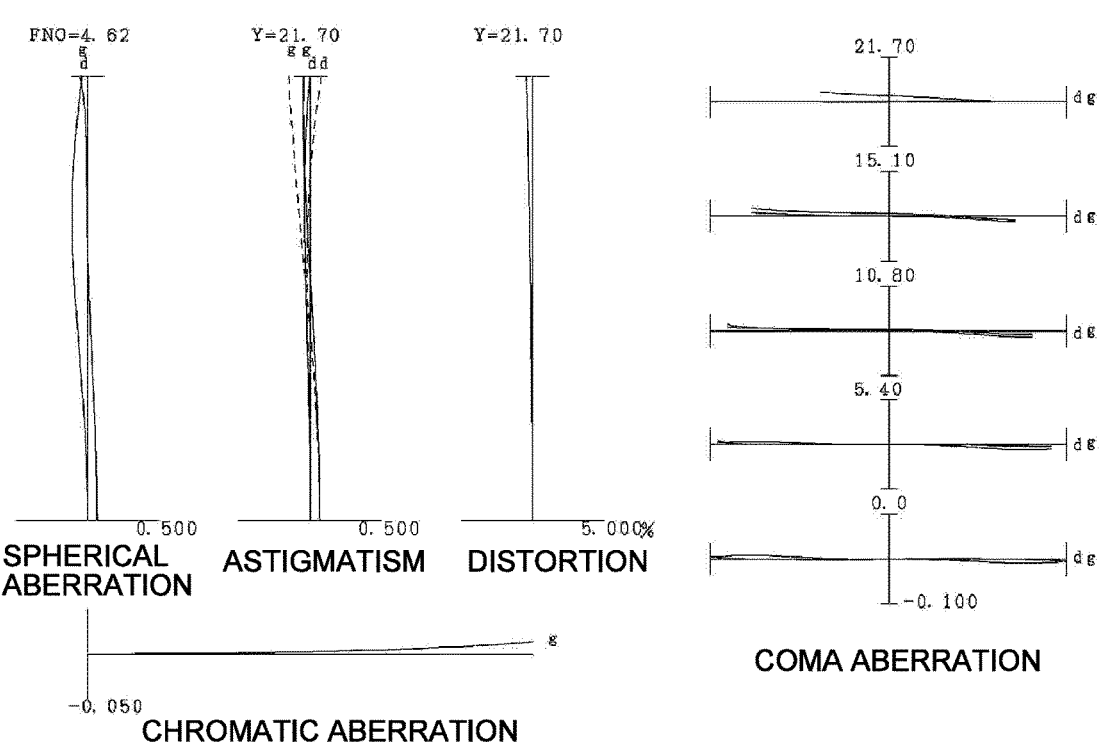
FIGS. 5A and 5B are graphs respectively showing various aberrations of the zoom optical system according to the second example upon focusing on infinity in a wide angle end state and a telephoto end state.
Figure 5B:
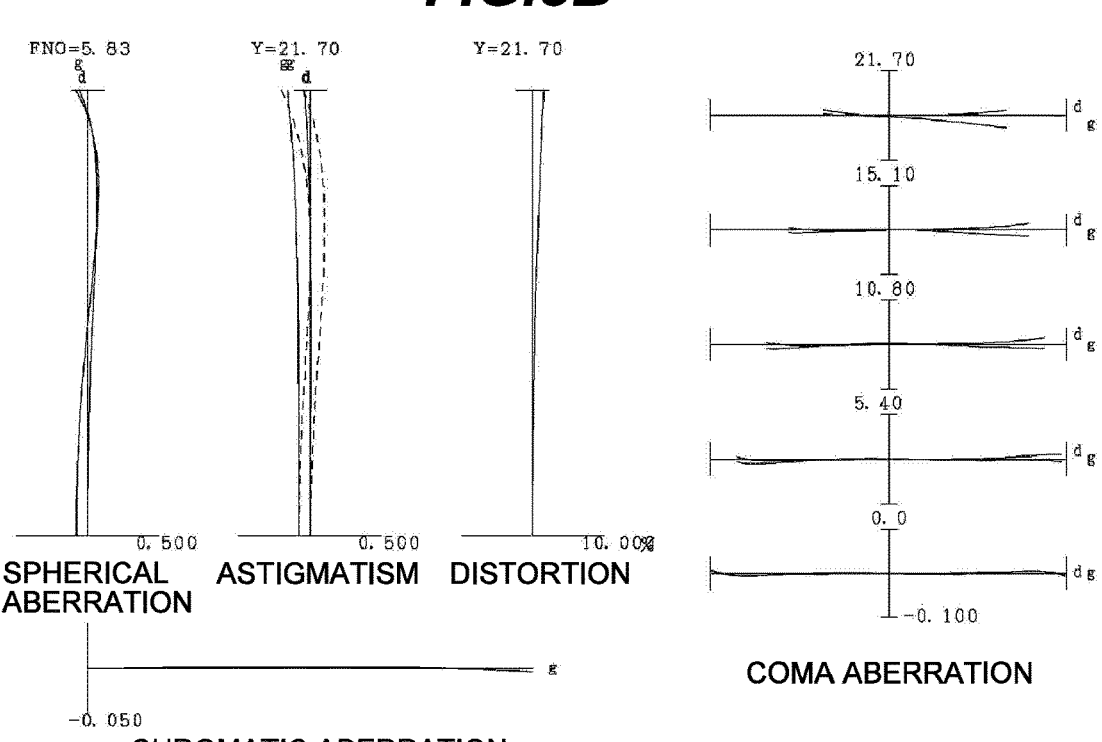
Figure 6A:
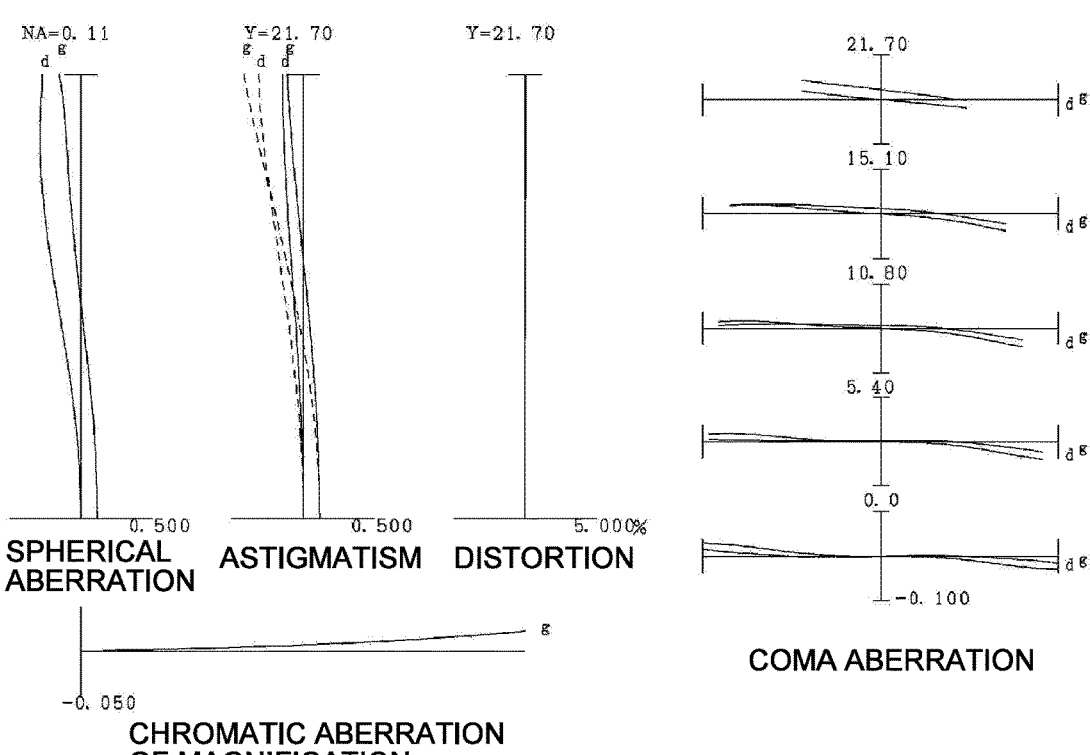
FIGS. 6A and 6B are graphs respectively showing various aberrations of the zoom optical system according to the second example upon focusing on a short distance object in the wide angle end state and the telephoto end state.
Figure 6B:
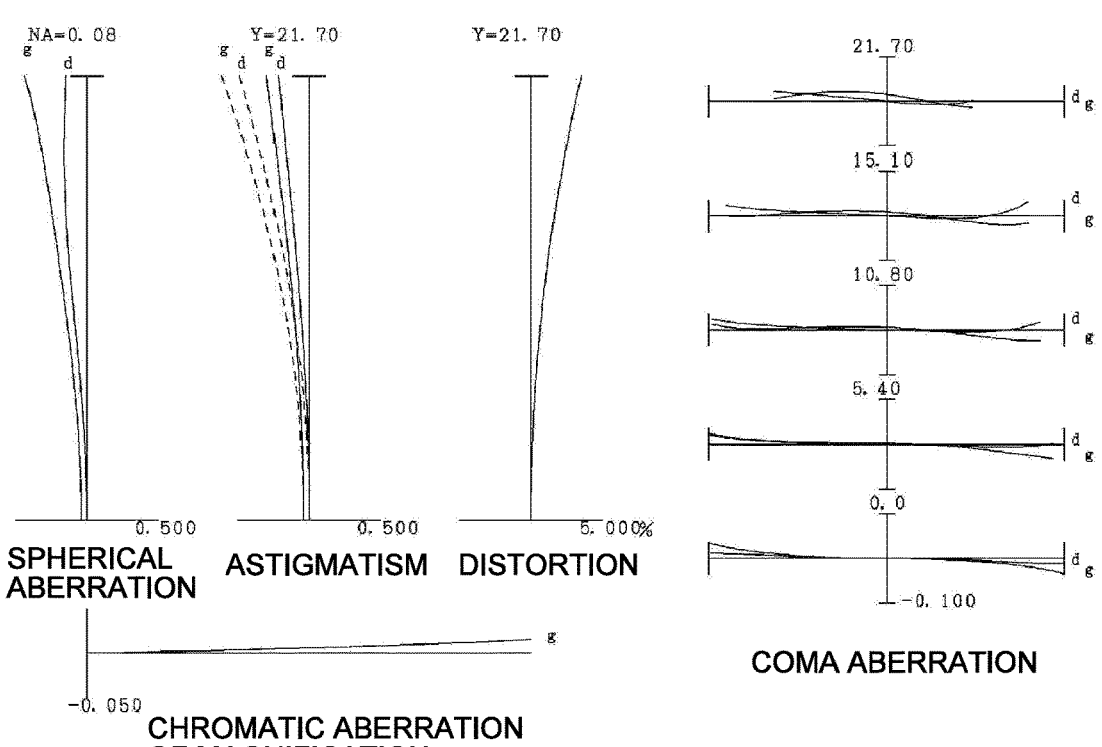

FIGS. 5A and 5B are graphs respectively showing various aberrations of the zoom optical system according to the second example upon focusing on infinity in the wide angle end state and the telephoto end state. FIGS. 6A and 6B are graphs respectively showing various aberrations of the zoom optical system according to the second example upon focusing on a short distance object in the wide angle end state and the telephoto end state.

The graphs showing various aberrations exhibit that the zoom optical system according to the second example favorably corrects various aberrations and has an excellent imaging performance from the wide angle end state to the telephoto end state, and further has an excellent imaging performance also upon focusing on the short distance object.

Third Example

Figure 7:
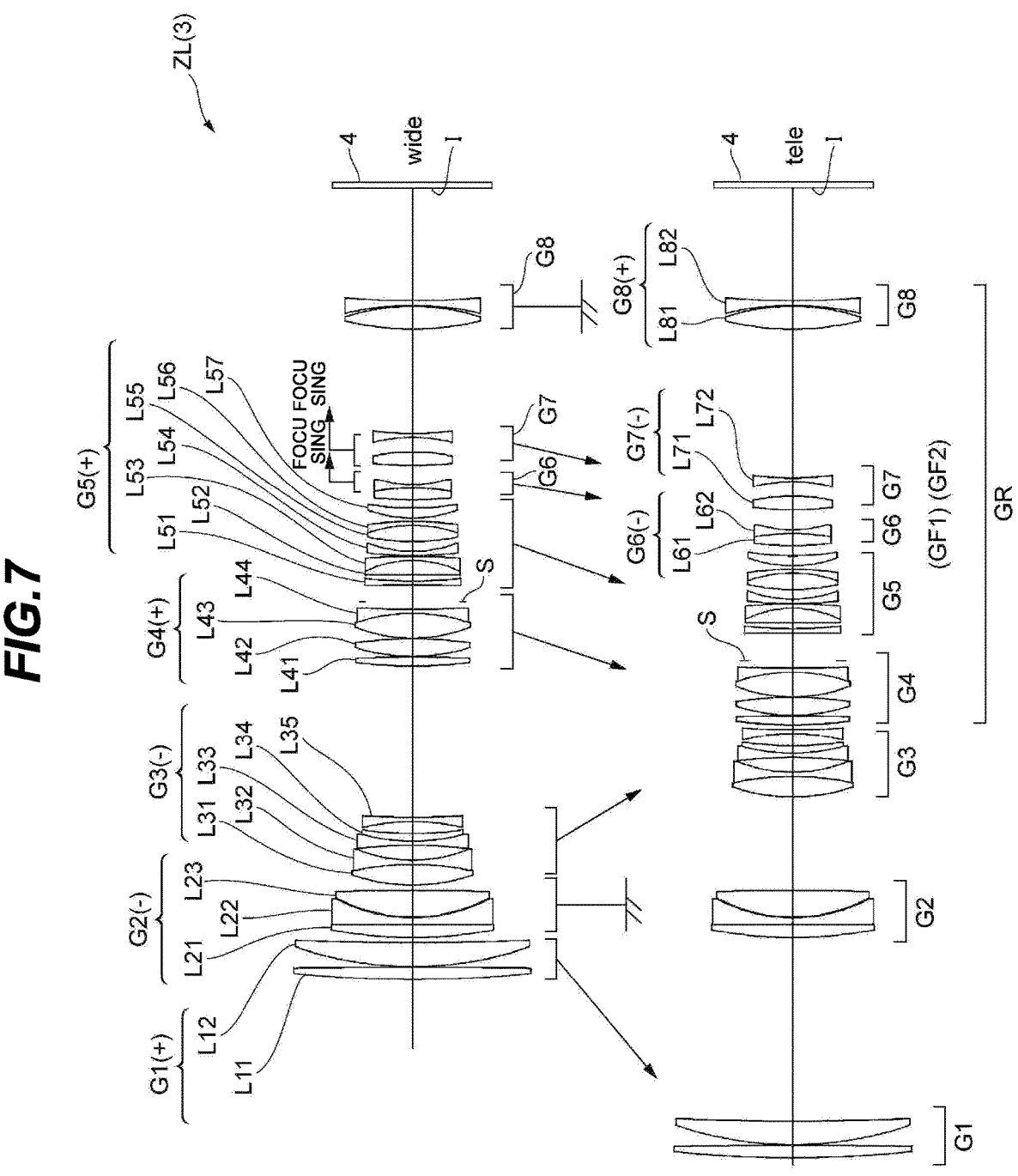
FIG. 7 shows a lens configuration of a zoom optical system according to a third example.

A third example is described with reference to FIGS. 7 to 9A and 9B and Table 3. FIG. 7 is a lens configuration diagram of a zoom optical system according to the third example. The zoom optical system ZL(3) according to the third example consists of, in order from the object: a first lens group G1 having a positive refractive power; a second lens group G2 having a negative refractive power; a third lens group G3 having a negative refractive power; a fourth lens group G4 having a positive refractive power; an aperture stop S; a fifth lens group G5 having a positive refractive power; a sixth lens group G6 having a negative refractive power; a seventh lens group G7 having a negative refractive power; and an eighth lens group G8 having a positive refractive power. Note that an imaging element 4 that includes an image surface I is disposed on the image-side of the eighth lens group G8.

Upon zooming from the wide angle end state (W) to the telephoto end state (T), the first lens group G1, and the third to seventh lens groups G3 to G7 move in the axial direction as indicated by arrows in FIG. 7, and the distances between lens groups adjacent to each other change. Note that the second and eighth lens groups G2 and G8 are fixed and stationary upon zooming. Note that the lens group that consists of the fourth to eighth lens groups G4 to G8 corresponds to the rear group GR.

The first lens group G1 consists of, in order from the object: a biconvex positive lens L11; and a positive meniscus lens L12 having a convex surface facing the object.

The second lens group G2 consists of, in order from the object: a cemented lens including a biconvex positive lens L21, and a biconcave negative lens L22; and a biconvex positive lens L23.

The third lens group G3 consists of, in order from the object: a cemented lens including a biconvex positive lens L31, and a biconcave negative lens L32; a cemented lens including a biconcave negative lens L33, and a positive meniscus lens L34 having a convex surface facing the object; and a biconcave negative lens L35.

The fourth lens group G4 consists of, in order from the object: a biconvex positive lens L41; a biconvex positive lens L42; a cemented lens including a biconvex positive lens L43, and a biconcave negative lens L44; and an aperture stop S. The aperture stop S is provided on the image-side of the fourth lens group G4, and moves with the fourth lens group G4 upon zooming.

The fifth lens group G5 consists of, in order from the object: a biconcave negative lens L51; a cemented lens including a positive meniscus lens L52 having a concave surface facing the object, and a negative meniscus lens L53 having a concave surface facing the object; a negative meniscus lens L54 having a convex surface facing the object; a cemented lens including a biconvex positive lens L55, and a negative meniscus lens L56 having a concave surface facing the object; and a positive meniscus lens L57 having a convex surface facing the object. Note that the cemented lens including the positive lens L55 and the negative meniscus lens L56 is a vibration proof lens controlled to move perpendicular to the optical axis. Camera shake correction and the like are performed by this lens.

The sixth lens group G6 consists of a cemented lens including a biconvex positive lens L61 and a biconcave negative lens L62. The sixth lens group G6 constitutes a first focusing lens group GF1 that is moved upon focusing.

The seventh lens group G7 consists of, in order from the object: a biconvex positive lens L71; and a biconcave negative lens L72. The seventh lens group G7 constitutes a second focusing lens group GF2 that is moved upon focusing.

The eighth lens group G8 consists of, in order from the object: a biconvex positive lens L81; and a biconcave negative lens L82.

In this example, as described above, the sixth lens group G6 constitutes the first focusing lens group GF1, and the seventh lens group G7 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 3 lists values of data on the zoom optical system according to the third example.

TABLE 3

| [General Data] | | | |
|---|---|---|---|
| | W | M | T |
| Entire Focal length f | 103.00 | 200.00 | 388.00 |
| Fno. | 4.62 | 5.10 | 5.93 |
| 2ω | 24.00 | 12.20 | 61.00 |
| Entire Length TL | 230.04 | 265.27 | 281.79 |
| Bf | 33.00 | 33.00 | 33.00 |

| [Lens Data] | | | |
|---|---|---|---|
| Surface | R | D | nd | vd |
|---|---|---|---|---|
| 1) | 326.0239 | 3.600 | 1.48749 | 70.32 |
| 2) | −2531.7885 | 0.150 | | |
| 3) | 103.1604 | 6.900 | 1.43385 | 95.23 |
| 4) | 771.4796 | (d1) | Variable | |
| 5) | 128.0909 | 3.800 | 1.66382 | 27.35 |
| 6) | −4641.4566 | 1.900 | 1.79504 | 28.69 |
| 7) | 47.6457 | 0.200 | | |
| 8) | 46.7899 | 7.800 | 1.43385 | 95.23 |
| 9) | −598.3072 | (d2) | Variable | |
| 10) | 53.8787 | 5.900 | 1.73800 | 32.33 |
| 11) | −85.7204 | 1.300 | 1.49782 | 82.57 |

TABLE 3-continued

| | | | | |
|---|---|---|---|---|
| 12) | 42.8717 | 4.324 | | |
| 13) | −128.8594 | 1.200 | 1.76385 | 48.49 |
| 14) | 55.5681 | 2.200 | 1.92286 | 20.88 |
| 15) | 101.6127 | 3.498 | | |
| 16) | −60.4530 | 1.200 | 1.76385 | 48.49 |
| 17) | 215.6397 | (d3) | Variable | |
| 18) | 142.7410 | 2.600 | 1.66382 | 27.35 |
| 19) | −420.7645 | 0.150 | | |
| 20) | 53.8491 | 5.200 | 1.43385 | 95.23 |
| 21) | −109.3350 | 0.150 | | |
| 22) | 46.0378 | 7.200 | 1.49782 | 82.57 |
| 23) | −49.5283 | 1.200 | 1.95000 | 29.37 |
| 24) | 463.7918 | 2.212 | | |
| 25) | 0.0000 | (d4) | Variable | Aperture stop S |
| 26) | −651.7880 | 1.200 | 1.66382 | 27.35 |
| 27) | 126.9388 | 1.737 | | |
| 28) | −1374.5057 | 4.200 | 1.74077 | 27.74 |
| 29) | −31.3985 | 1.200 | 1.49782 | 82.57 |
| 30) | −199.4701 | 0.200 | | |
| 31) | 116.4253 | 1.200 | 1.84666 | 23.80 |
| 32) | 34.9470 | 2.807 | | |
| 33) | 59.8644 | 4.800 | 1.63854 | 55.34 |
| 34) | −38.6623 | 1.100 | 1.90366 | 31.27 |
| 35) | −92.8568 | 1.000 | | |
| 36) | 38.1635 | 2.889 | 1.73800 | 32.33 |
| 37) | 76.6911 | (d5) | Variable | |
| 38) | 114.5396 | 3.414 | 1.85026 | 32.35 |
| 39) | −68.8190 | 1.100 | 1.76385 | 48.49 |
| 40) | 33.9421 | (d6) | Variable | |
| 41) | 103.0093 | 3.927 | 1.56732 | 42.58 |
| 42) | −55.6727 | 4.270 | | |
| 43) | −44.6064 | 1.100 | 1.76385 | 48.49 |
| 44) | 86.1100 | (d7) | Variable | |
| 45) | 81.9535 | 6.600 | 1.54814 | 45.51 |
| 46) | −63.9939 | 0.200 | 1.00000 | |
| 47) | −85.5518 | 1.400 | 1.63854 | 55.34 |
| 48) | 200.0000 | 31.498 | | |
| Image Surface (I) | ∞ | | | |

[Lens Group Data]

| Group | First surface | Focal length |
|---|---|---|
| f1 | 1 | 187.543 |
| f2 | 5 | −720.372 |
| f3 | 10 | −48.172 |
| f4 | 18 | 52.271 |
| f5 | 26 | 86.198 |
| f6 | 38 | −74.554 |
| f7 | 41 | −119.711 |
| f8 | 45 | 212.301 |

| | W invinity | M infinity | T infinity | W vicinity | M vicinity | T vicinity |
|---|---|---|---|---|---|---|
| | | | [Variable Distance Data] | | | |
| f(β) | 103.00000 | 199.99999 | 387.99992 | −0.12368 | −0.21526 | −0.38504 |
| (d1) | 1.50000 | 36.73173 | 53.24263 | 1.50000 | 36.73173 | 53.24263 |
| (d2) | 1.50000 | 17.74391 | 26.98619 | 1.50000 | 17.74391 | 26.98619 |
| (d3) | 44.06594 | 24.88658 | 1.50000 | 44.06594 | 24.88658 | 1.50000 |
| (d4) | 4.73843 | 3.68455 | 7.97230 | 4.73843 | 3.68455 | 7.97230 |
| (d5) | 2.41181 | 4.74774 | 3.02499 | 3.54963 | 12.36048 | 34.63431 |
| (d6) | 5.52851 | 3.22742 | 5.84898 | 13.54479 | 9.91379 | 4.31298 |
| (d7) | 30.27159 | 34.22471 | 43.18580 | 21.11779 | 19.92492 | 13.11421 |
| | | | [Each Group Magnification] | | | |
| G1 | 0.00000 | 0.00000 | 0.00000 | −0.33255 | −0.35479 | −0.36572 |
| G2 | 1.30482 | 1.22655 | 1.19301 | 1.47100 | 1.38326 | 1.34589 |
| G3 | −0.31483 | −0.59930 | −1.02540 | −0.17664 | −0.24924 | −0.30662 |
| G4 | −1.01142 | −1.13129 | −1.20593 | −1.16096 | −1.78143 | −5.99494 |
| G5 | 0.55159 | 0.52691 | 0.52816 | 0.52532 | 0.43628 | 0.20845 |
| G6 | 1.88770 | 1.87779 | 1.95743 | 1.94316 | 1.88727 | 1.76927 |
| G7 | 1.57428 | 1.60729 | 1.68218 | 1.49782 | 1.48784 | 1.43099 |
| G8 | 0.80640 | 0.80640 | 0.80639 | 0.80639 | 0.80640 | 0.80638 |

TABLE 3-continued

| [Other Data] | |
| --- | --- |
| D1 | 10.650 |
| D2 | 13.700 |
| Δd1 | −51.747 |
| Δd2 | 0.000 |
| Δd3 | 25.482 |
| fL1 | 592.730 |
| fR | 212.301 |
| fF1 | −74.554 |
| fF2 | −119.711 |

Figure 8A:
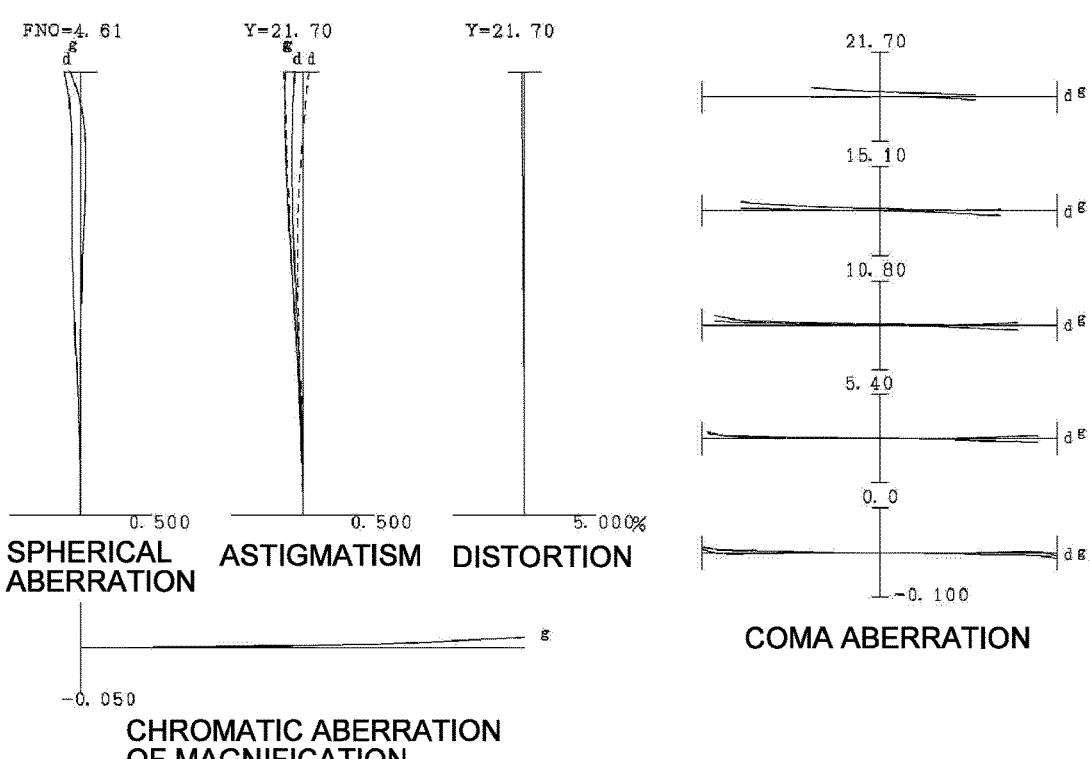
FIGS. 8A and 8B are graphs respectively showing various aberrations of the zoom optical system according to the third example upon focusing on infinity in a wide angle end state and a telephoto end state.
Figure 8B:
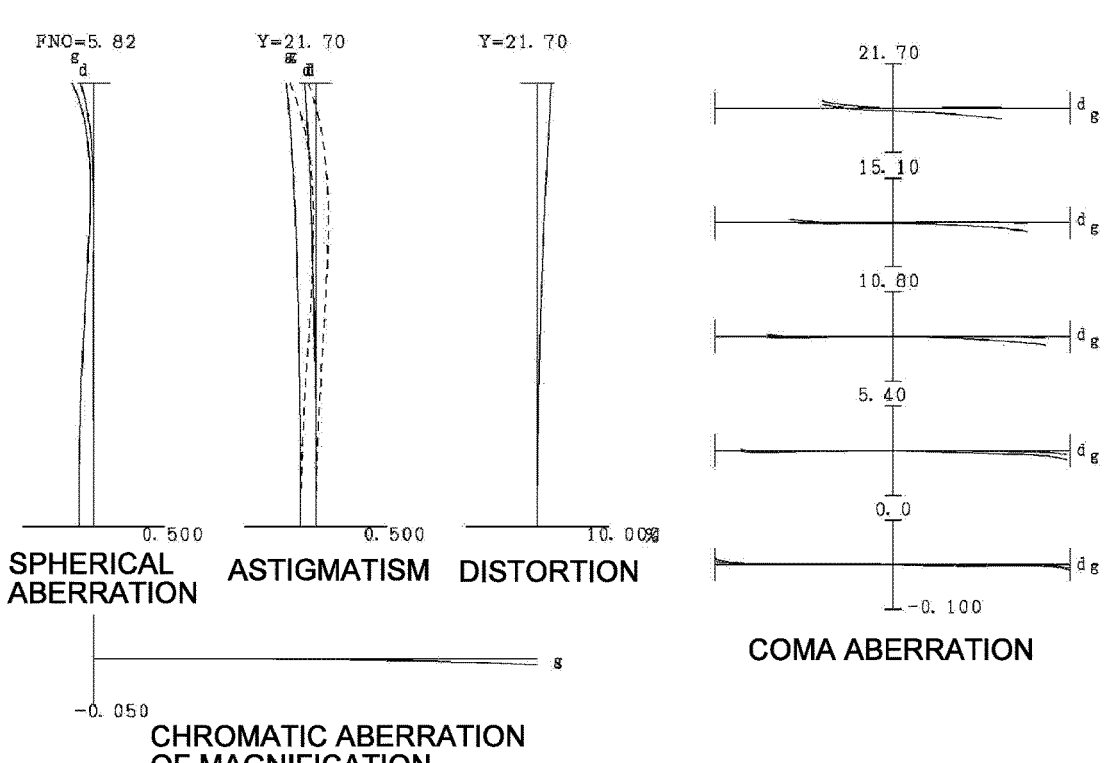
Figure 9A:
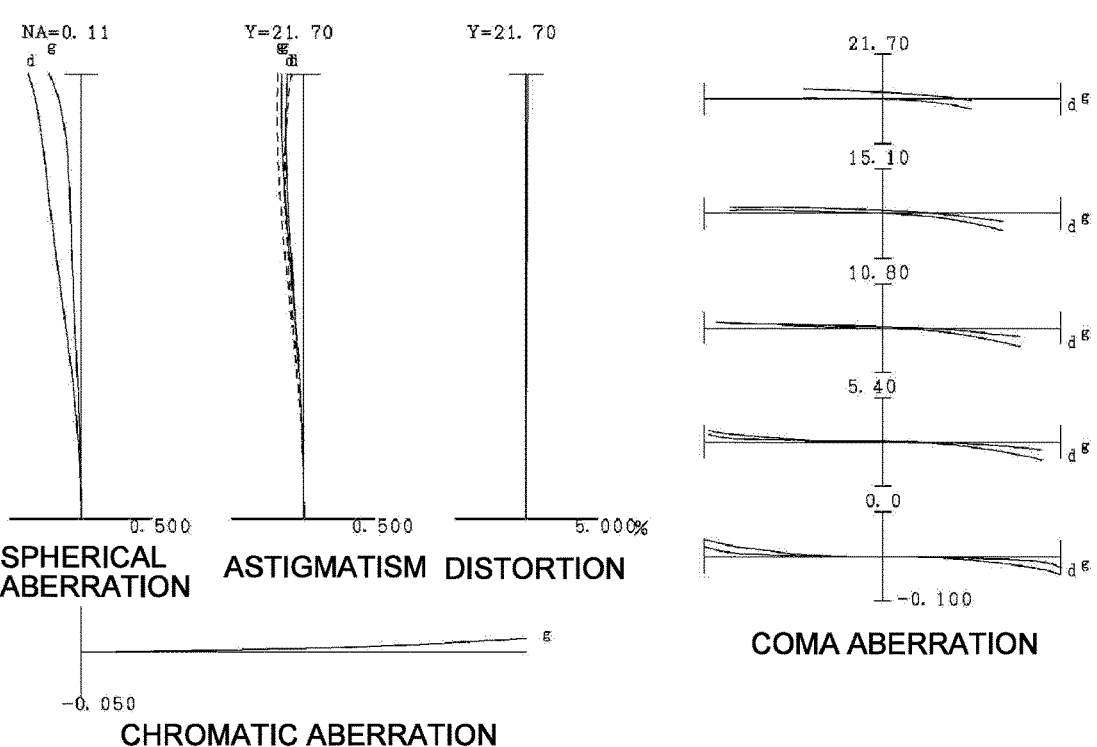
FIGS. 9A and 9B are graphs respectively showing various aberrations of the zoom optical system according to the third example upon focusing on a short distance object in the wide angle end state and the telephoto end state.
Figure 9B:
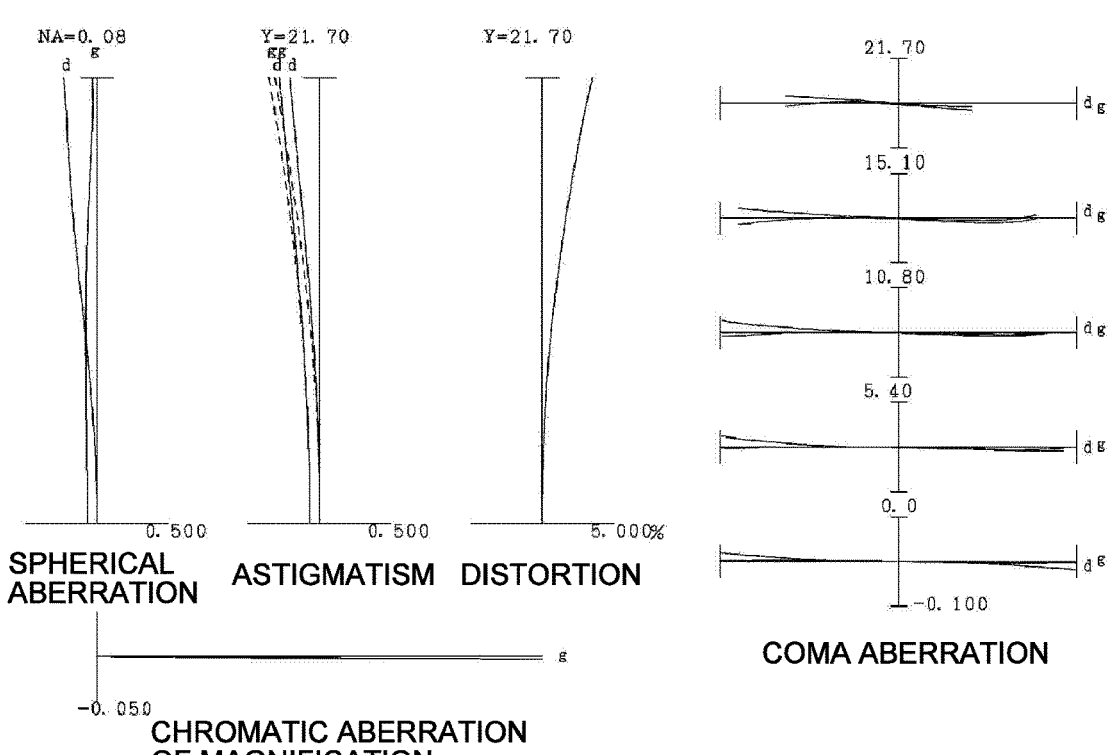

FIGS. 8A and 8B are graphs respectively showing various aberrations of the zoom optical system according to the third example upon focusing on infinity in the wide angle end state and the telephoto end state. FIGS. 9A and 9B are graphs respectively showing various aberrations of the zoom optical system according to the third example upon focusing on a short distance object in the wide angle end state and the telephoto end state.

The graphs showing various aberrations exhibit that the zoom optical system according to the third example favorably corrects various aberrations and has an excellent imaging performance from the wide angle end state to the telephoto end state, and further has an excellent imaging performance also upon focusing on the short distance object.

Fourth Example

Figure 10:
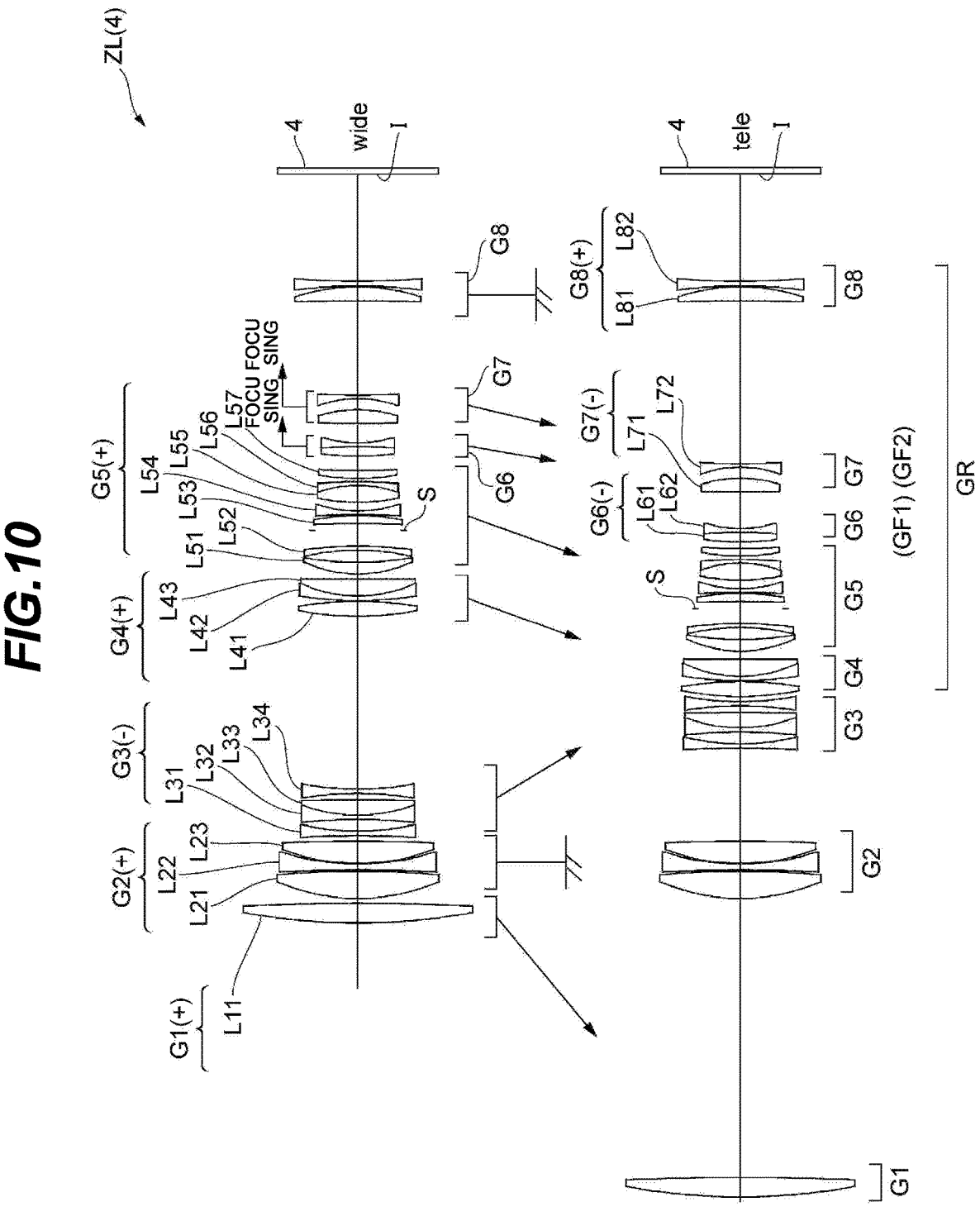
FIG. 10 shows a lens configuration of a zoom optical system according to a fourth example.

A fourth example is described with reference to FIGS. 10 to 12A and 12B and Table 4. FIG. 10 is a lens configuration diagram of a zoom optical system according to the fourth example. The zoom optical system ZL(4) according to the fourth example consists of, in order from the object: a first lens group G1 having a positive refractive power; a second lens group G2 having a positive refractive power; a third lens group G3 having a negative refractive power; a fourth lens group G4 having a positive refractive power; a fifth lens group G5 having a positive refractive power; an aperture stop S disposed in the fifth lens group G5; a sixth lens group G6 having a negative refractive power; a seventh lens group G7 having a negative refractive power; and an eighth lens group G8 having a positive refractive power. Note that an imaging element 4 that includes an image surface I is disposed on the image-side of the eighth lens group G8.

Upon zooming from the wide angle end state (W) to the telephoto end state (T), the first lens group G1, and the third to seventh lens groups G3 to G7 move in the axial direction as indicated by arrows in FIG. 10, and the distances between lens groups adjacent to each other change. Note that the second and eighth lens groups G2 and G8 are fixed and stationary upon zooming. Note that the lens group that consists of the fourth to eighth lens groups G4 to G8 corresponds to the rear group GR.

The first lens group G1 comprises a biconvex positive lens L11.

The second lens group G2 consists of, in order from the object: a biconvex positive lens L21; a biconcave negative lens L22; and a biconvex positive lens L23.

The third lens group G3 consists of, in order from the object: a biconcave negative lens L31; a cemented lens including a biconcave negative lens L32, and a biconvex positive lens L33; and a biconcave negative lens L34.

The fourth lens group G4 consists of, in order from the object: a biconvex positive lens L41; and a cemented lens including a negative meniscus lens L42 having a convex surface facing the object, and a biconvex positive lens L43.

The fifth lens group G5 consists of, in order from the object: a positive meniscus lens L51 having a convex surface facing the object; a negative meniscus lens L52 having a concave surface facing the object; an aperture stop S; a positive meniscus lens L53 having a concave surface facing the object; a biconcave negative lens L54; a cemented lens including a biconvex positive lens L55, and a negative meniscus lens L56 having a concave surface facing the object; and a positive meniscus lens L57 having a convex surface facing the object. Note that the cemented lens including the positive lens L55 and the negative meniscus lens L56 is a vibration proof lens controlled to move perpendicular to the optical axis. Camera shake correction and the like are performed by this lens.

The sixth lens group G6 consists of a cemented lens including a biconvex positive lens L61 and a biconcave negative lens L62. The sixth lens group G6 constitutes a first focusing lens group GF1 that is moved upon focusing.

The seventh lens group G7 consists of, in order from the object: a biconvex positive lens L71; and a biconcave negative lens L72. The seventh lens group G7 constitutes a second focusing lens group GF2 that is moved upon focusing.

The eighth lens group G8 consists of, in order from the object: a positive meniscus lens L81 having a concave surface facing the object; and a biconcave negative lens L82.

In this example, as described above, the sixth lens group G6 constitutes the first focusing lens group GF1, and the seventh lens group G7 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 4 lists values of data on the zoom optical system according to the fourth example.

TABLE 4

| [General Data] | | | |
|---|---|---|---|
| | W | M | T |
| Entire Focal length f | 103.00 | 200.00 | 388.00 |
| Fno. | 4.62 | 4.82 | 5.77 |
| 2ω | 24.00 | 12.20 | 61.00 |
| Entire Length TL | 230.01 | 284.45 | 314.04 |
| Bf | 33.00 | 33.00 | 33.00 |

| [Lens Data] | | | | |
|---|---|---|---|---|
| Surface | R | D | nd | νd |
| 1) | 192.8854 | 6.000 | 1.48749 | 70.32 |
| 2) | −750.1515 | (d1) | Variable | |
| 3) | 61.9299 | 8.300 | 1.43385 | 95.23 |
| 4) | −300.7596 | 0.457 | | |
| 5) | −376.3860 | 1.800 | 1.83400 | 37.18 |
| 6) | 73.6276 | 0.200 | | |
| 7) | 62.1468 | 6.900 | 1.43385 | 95.23 |
| 8) | −617.4323 | (d2) | Variable | |
| 9) | −294.0488 | 1.300 | 1.49782 | 82.57 |
| 10) | 71.4570 | 3.656 | | |
| 11) | −159.4445 | 1.300 | 1.72916 | 54.61 |
| 12) | 48.2238 | 4.706 | 2.05090 | 26.94 |
| 13) | −538.4773 | 2.022 | | |
| 14) | −102.0759 | 1.300 | 1.69680 | 55.52 |
| 15) | 93.1021 | (d3) | Variable | |
| 16) | 88.5890 | 4.653 | 1.59319 | 67.90 |
| 17) | −103.6498 | 0.200 | | |
| 18) | 111.6169 | 1.400 | 1.95000 | 29.37 |
| 19) | 41.2387 | 5.254 | 1.59319 | 67.90 |
| 20) | −2808.9377 | (d4) | Variable | |
| 21) | 38.6339 | 3.547 | 1.73800 | 32.33 |
| 22) | 94.6995 | 3.719 | | |
| 23) | −68.9596 | 1.200 | 1.48749 | 70.32 |
| 24) | −132.6897 | 4.717 | | |
| 25) | 0.0000 | 2.189 | Aperture stop S | |
| 26) | −425.1177 | 2.506 | 1.74152 | 27.53 |
| 27) | −71.9852 | 0.200 | | |
| 28) | −274.8647 | 1.200 | 1.95981 | 26.42 |
| 29) | 39.6346 | 2.660 | | |
| 30) | 62.6805 | 5.213 | 1.67790 | 55.35 |
| 31) | −35.4953 | 1.100 | 1.83400 | 37.18 |
| 32) | −131.2644 | 1.000 | | |
| 33) | 65.3831 | 2.403 | 1.80261 | 25.03 |
| 34) | 212.9654 | (d5) | Variable | |
| 35) | 92.1132 | 2.938 | 1.83898 | 33.32 |
| 36) | −119.0260 | 1.100 | 1.76991 | 47.38 |
| 37) | 34.6476 | (d6) | Variable | |
| 38) | 460.6463 | 4.106 | 1.60342 | 38.03 |
| 39) | −42.7661 | 3.435 | | |
| 40) | −36.8112 | 1.100 | 1.76385 | 48.49 |
| 41) | 276.1876 | (d7) | Variable | |
| 42) | −596.8666 | 4.458 | 1.58553 | 39.69 |
| 43) | −59.0675 | 0.200 | | |
| 44) | −144.8232 | 1.500 | 1.48749 | 70.32 |
| 45) | 250.0331 | 33.000 | | |
| Image Surface (I) | ∞ | | | |

| [Lens Group Data] | | |
|---|---|---|
| Group | First surface | Focal length |
| f1 | 1 | 315.399 |
| f2 | 3 | 355.595 |
| f3 | 9 | −50.752 |
| f4 | 16 | 80.050 |
| f5 | 21 | 93.244 |
| f6 | 35 | −83.752 |
| f7 | 38 | −146.407 |
| f8 | 42 | 274.030 |

TABLE 4-continued

| | W<br>infinity | M<br>infinity | T<br>infinity | W<br>vicinity | M<br>vicinity | T<br>vicinity |
|---|---|---|---|---|---|---|
| | | | [Variable Distance Data] | | | |
| f(β) | 103.00000 | 200.00002 | 388.00008 | −0.12098 | −0.21181 | −0.40232 |
| (d1) | 1.50000 | 55.93241 | 85.52165 | 1.50000 | 55.93241 | 85.52165 |
| (d2) | 1.72737 | 14.90241 | 28.51234 | 1.72737 | 14.90241 | 28.51234 |
| (d3) | 52.98546 | 26.26922 | 1.50000 | 52.98546 | 26.26922 | 1.50000 |
| (d4) | 1.50000 | 12.04177 | 2.38454 | 1.50000 | 12.04177 | 2.38454 |
| (d5) | 4.39779 | 6.91374 | 2.00000 | 4.63443 | 15.13150 | 35.07688 |
| (d6) | 6.00747 | 3.80747 | 11.26079 | 23.18613 | 22.88699 | 7.78624 |
| (d7) | 28.96054 | 31.64459 | 49.92152 | 11.54533 | 4.34748 | 20.32252 |
| | | | [Each Group Magnification] | | | |
| G1 | 0.00000 | 0.00000 | 0.00000 | −0.69224 | −0.78613 | −0.84631 |
| G2 | 0.52622 | 0.57232 | 0.60094 | 0.39772 | 0.40907 | 0.41413 |
| G3 | −0.57284 | −0.85978 | −1.44008 | −0.37793 | −0.43349 | −0.49918 |
| G4 | −1.39092 | −1.76327 | −1.59842 | −1.67962 | −3.36864 | −34.38321 |
| G5 | 0.35195 | 0.32810 | 0.33223 | 0.32371 | 0.22593 | 0.03210 |
| G6 | 1.76819 | 1.75725 | 1.94419 | 1.86362 | 1.80747 | 1.73649 |
| G7 | 1.43053 | 1.44886 | 1.57369 | 1.31158 | 1.26241 | 1.37154 |
| G8 | 0.87491 | 0.87491 | 0.87491 | 0.87491 | 0.87491 | 0.87490 |

[Other Data]

| | |
|---|---|
| D1 | 6.000 |
| D2 | 17.657 |
| Δd1 | −84.022 |
| Δd2 | 0.000 |
| Δd3 | 26.784 |
| fL1 | 315.399 |
| fR | 274.030 |
| fF1 | −83.752 |
| fF2 | −146.407 |

Figure 11A:
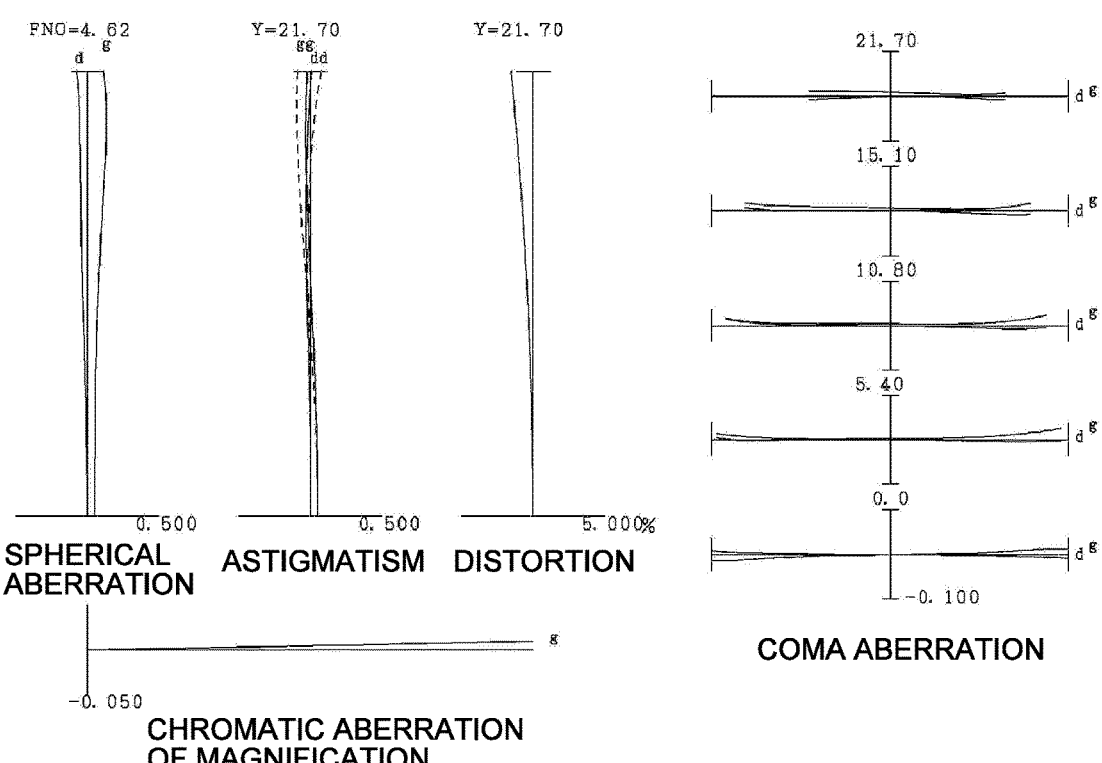
FIGS. 11A and 11B are graphs respectively showing various aberrations of the zoom optical system according to the fourth example upon focusing on infinity in a wide angle end state and a telephoto end state.
Figure 11B:
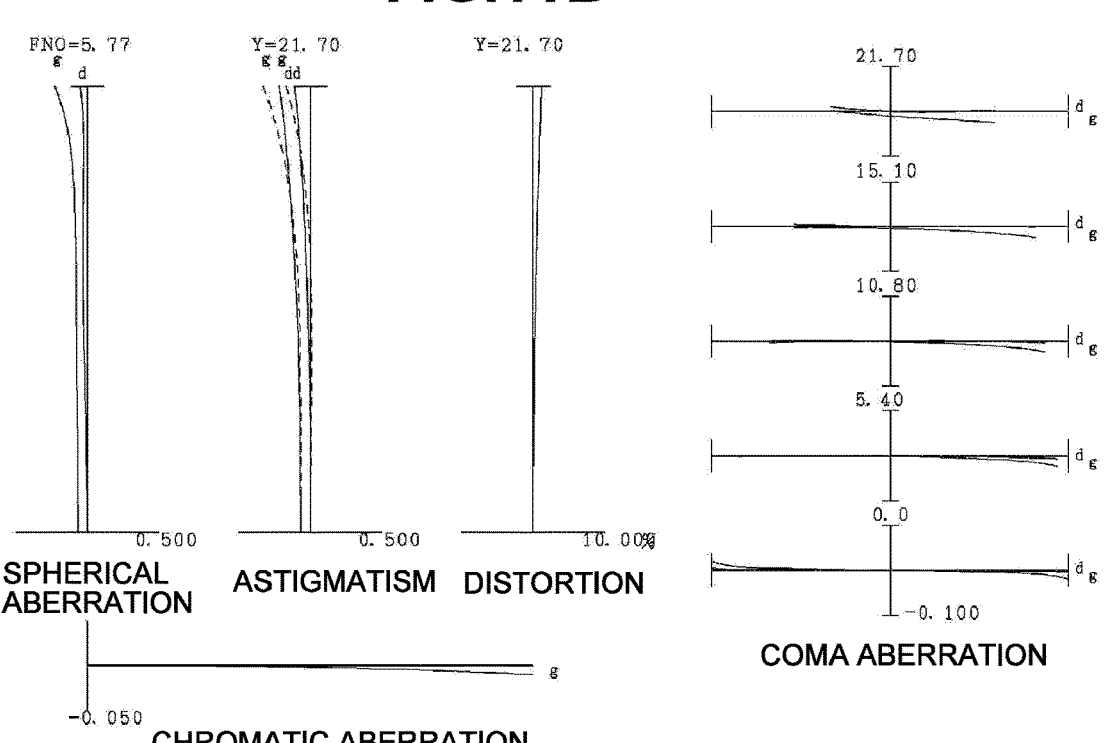
Figure 12A:
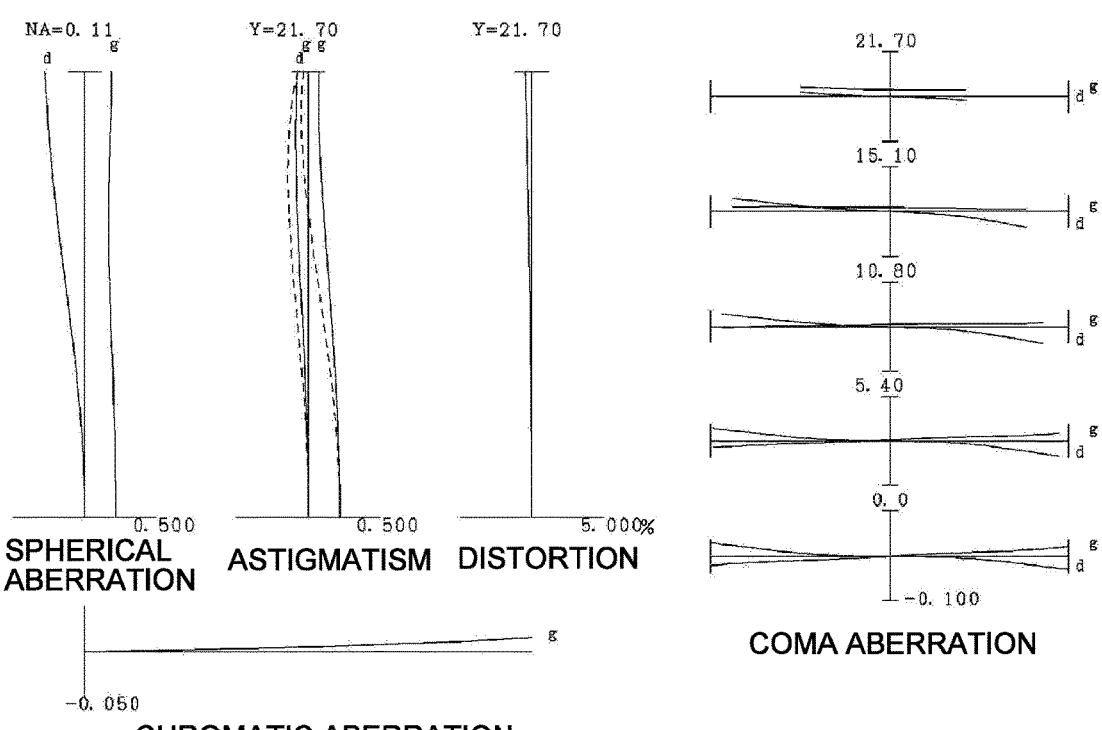
FIGS. 12A and 12B are graphs respectively showing various aberrations of the zoom optical system according to the fourth example upon focusing on a short distance object in the wide angle end state and the telephoto end state.
Figure 12B:
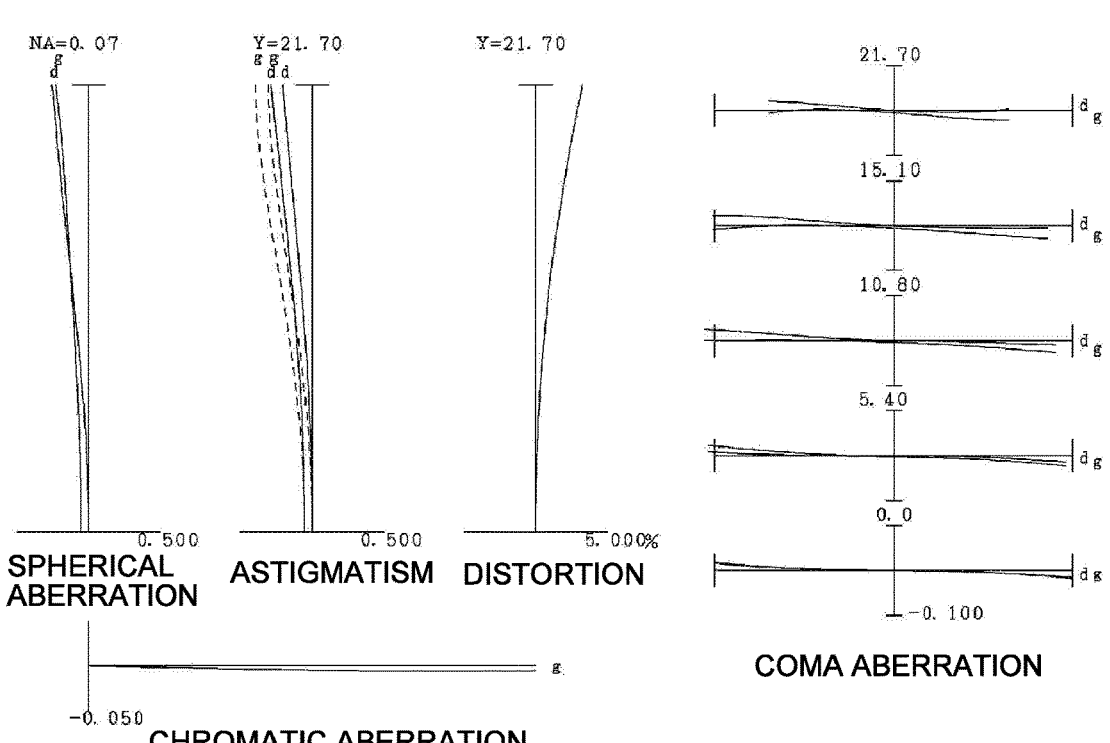

FIGS. 11A and 11B are graphs respectively showing various aberrations of the zoom optical system according to the fourth example upon focusing on infinity in the wide angle end state and the telephoto end state. FIGS. 12A and 12B are graphs respectively showing various aberrations of the zoom optical system according to the fourth example upon focusing on a short distance object in the wide angle end state and the telephoto end state.

The graphs showing various aberrations exhibit that the zoom optical system according to the fourth example favorably corrects various aberrations and has an excellent imaging performance from the wide angle end state to the telephoto end state, and further has an excellent imaging performance also upon focusing on the short distance object.

Fifth Example

Figure 13:
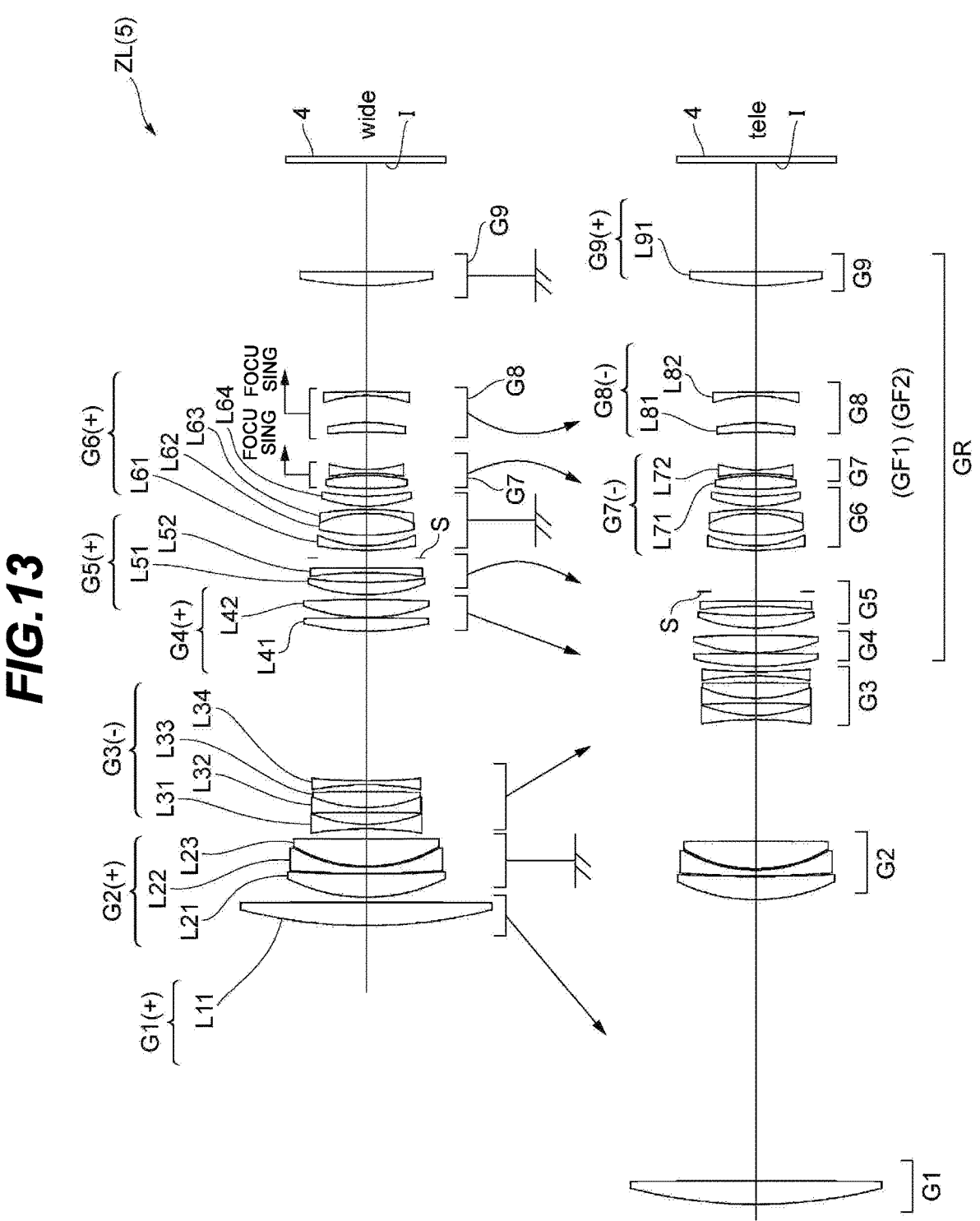
FIG. 13 shows a lens configuration of a zoom optical system according to a fifth example.

A fifth example is described with reference to FIGS. 13 to 15A and 15B and Table 5. FIG. 13 is a lens configuration diagram of a zoom optical system according to the fifth example. The zoom optical system ZL(5) according to the fifth example consists of, in order from the object: a first lens group G1 having a positive refractive power; a second lens group G2 having a positive refractive power; a third lens group G3 having a negative refractive power; a fourth lens group G4 having a positive refractive power; a fifth lens group G5 having a positive refractive power; an aperture stop S; a sixth lens group G6 having a positive refractive power; a seventh lens group G7 having a negative refractive power; and an eighth lens group G8 having a negative refractive power. Note that an imaging element 4 that includes an image surface I is disposed on the image-side of the ninth lens group G9.

Upon zooming from the wide angle end state (W) to the telephoto end state (T), the first lens group G1, the third to fifth lens groups G3 to G5, and the seventh and eighth lens groups G7 and G8 move in the axial direction as indicated by arrows in FIG. 13, and the distances between lens groups adjacent to each other change. Note that the second, sixth and ninth lens groups G2, G6 and G9 are fixed and stationary upon zooming. Note that the lens group that consists of the fourth to ninth lens groups G4 to G9 corresponds to the rear group GR.

The first lens group G1 comprises a biconvex positive lens L11.

The second lens group G2 consists of, in order from the object: a positive meniscus lens L21 having a convex surface facing the object; a negative meniscus lens L22 having a convex surface facing the object; and a biconvex positive lens L23.

The third lens group G3 consists of, in order from the object: a biconcave negative lens L31; a cemented lens including a biconcave negative lens L32, and a biconvex positive lens L33; and a biconcave negative lens L34.

The fourth lens group G4 consists of, in order from the object: a biconvex positive lens L41; and a biconvex positive lens L42.

The fifth lens group G5 consists of, in order from the object: a positive meniscus lens L51 having a convex surface facing the object; a plano-concave lens L52 having a concave surface facing the object, and a planar surface facing the image; and an aperture stop S. The aperture stop S is provided on the image-side of the fifth lens group G5, and moves with the fifth lens group G5 upon zooming.

The sixth lens group G6 consists of, in order from the object: a negative meniscus lens L61 having a convex surface facing the object; a cemented lens including a biconvex positive lens L62 and a negative meniscus lens L63 having a concave surface facing the object; and a positive meniscus lens L64 having a convex surface facing the object. Note that the cemented lens including the positive lens L62 and the negative meniscus lens L63 is a vibration proof lens controlled to move perpendicular to the optical axis. Camera shake correction and the like are performed by this lens.

The seventh lens group G7 consists of, in order from the object: a biconvex positive lens L71; and a biconcave negative lens L72. The seventh lens group G7 constitutes a first focusing lens group GF1 that is moved upon focusing.

The eighth lens group G8 consists of, in order from the object: a positive meniscus lens L81 having a concave surface facing the object; and a negative meniscus lens L82 having a concave surface facing the object. The eighth lens group G8 constitutes a second focusing lens group GF2 that is moved upon focusing.

The ninth lens group G9 consists of a positive meniscus lens L91 having a convex surface facing the object.

In this example, as described above, the seventh lens group G7 constitutes the first focusing lens group GF1, and the eighth lens group G8 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 5 lists values of data on the zoom optical system according to the fifth example.

TABLE 5

| [General Data] | | | |
|---|---|---|---|
| | W | M | T |
| Entire Focal length f | 103.00 | 200.00 | 388.00 |
| Fno. | 4.72 | 4.81 | 5.83 |
| 2ω | 24.00 | 12.20 | 61.00 |
| Entire Length TL | 230.03 | 283.98 | 313.42 |
| Bf | 32.80 | 32.80 | 32.80 |

| [Lens Data] | | | |
|---|---|---|---|
| Surface | R | D | nd | vd |
|---|---|---|---|---|
| 1) | 151.7547 | 7.100 | 1.48749 | 70.32 |
| 2) | −2673.8763 | (d1) | Variable | |
| 3) | 54.3416 | 6.900 | 1.43385 | 95.23 |
| 4) | 395.2695 | 0.200 | | |
| 5) | 254.9799 | 1.800 | 1.83400 | 37.18 |
| 6) | 43.7519 | 0.400 | | |
| 7) | 43.1697 | 8.300 | 1.43385 | 95.23 |
| 8) | −1349.8686 | (d2) | Variable | |
| 9) | −103.4436 | 1.300 | 1.49782 | 82.57 |
| 10) | 45.2178 | 3.581 | | |
| 11) | −607.4954 | 1.400 | 1.77250 | 49.62 |
| 12) | 41.2183 | 4.653 | 2.05090 | 26.94 |
| 13) | −2240.9221 | 2.123 | | |
| 14) | −96.4829 | 1.300 | 1.72916 | 54.61 |
| 15) | 190.6832 | (d3) | Variable | |
| 16) | 73.4321 | 4.060 | 1.49700 | 81.54 |
| 17) | −1221.9977 | 0.200 | | |
| 18) | 55.1976 | 5.041 | 1.49700 | 81.54 |
| 19) | −504.0704 | (d4) | Variable | |
| 20) | 47.1382 | 3.732 | 1.49782 | 82.57 |
| 21) | 128.8291 | 2.813 | | |
| 22) | −148.5282 | 1.400 | 1.48749 | 70.32 |
| 23) | 0.0000 | 3.000 | | |
| 24) | 0.0000 | (d5) | Variable | Aperture stop S |
| 25) | 84.8184 | 1.300 | 2.00069 | 25.46 |
| 26) | 34.6177 | 3.118 | | |
| 27) | 58.2700 | 6.750 | 1.60300 | 65.44 |
| 28) | −34.7763 | 1.200 | 1.83400 | 37.18 |
| 29) | −82.9878 | 1.000 | | |
| 30) | 40.7807 | 2.934 | 1.73800 | 32.33 |
| 31) | 79.4208 | (d6) | Variable | |
| 32) | 94.9267 | 3.861 | 1.72825 | 28.38 |
| 33) | −59.6113 | 0.724 | | |
| 34) | −60.2546 | 1.100 | 1.83481 | 42.73 |
| 35) | 38.9513 | (d7) | Variable | |
| 36) | −97.7819 | 2.750 | 1.68893 | 31.16 |

TABLE 5-continued

| | | | | |
|---|---|---|---|---|
| 37) | −49.0112 | 9.017 | | |
| 38) | −38.4972 | 1.100 | 1.83481 | 42.73 |
| 39) | −242.2994 | (d8) | Variable | |
| 40) | 94.7874 | 4.134 | 1.64769 | 33.72 |
| 41) | 2526.6166 | 32.800 | | |
| Image Surface (I) | ∞ | | | |

[Lens Group Data]

| Group | First surface | Focal length |
|---|---|---|
| f1 | 1 | 294.822 |
| f2 | 3 | 543.345 |
| f3 | 9 | −45.022 |
| f4 | 16 | 59.149 |
| f5 | 20 | 272.824 |
| f6 | 25 | 134.161 |
| f7 | 32 | −69.349 |
| f8 | 36 | −99.312 |
| f9 | 40 | 151.950 |

| | W infinity | M infinity | T infinity | W vicinity | M vicinity | T vicinity |
|---|---|---|---|---|---|---|
| [Variable Distance Data] | | | | | | |
| f(β) | 102.99981 | 199.99999 | 388.00004 | −0.12335 | −0.21579 | −0.35353 |
| (d1) | 1.50000 | 55.44587 | 84.89443 | 1.50000 | 55.44587 | 84.89443 |
| (d2) | 2.96781 | 20.63888 | 36.57284 | 2.96781 | 20.63888 | 36.57284 |
| (d3) | 45.17538 | 22.60012 | 1.50000 | 45.17538 | 22.60012 | 1.50000 |
| (d4) | 1.50000 | 7.15032 | 1.50000 | 1.50000 | 7.15032 | 1.50000 |
| (d5) | 2.24588 | 1.50000 | 12.31617 | 2.24588 | 1.50000 | 12.31617 |
| (d6) | 2.45752 | 7.49567 | 2.15559 | 2.82352 | 12.81613 | 31.04627 |
| (d7) | 11.49365 | 4.20368 | 11.07534 | 21.11963 | 17.91064 | 12.50182 |
| (d8) | 31.59668 | 33.84837 | 32.31708 | 21.60474 | 14.82097 | 2.00001 |
| [Each Group Magnification] | | | | | | |
| G1 | 0.00000 | 0.00000 | 0.00000 | −0.61964 | −0.69876 | −0.75102 |
| G2 | 0.63861 | 0.68184 | 0.70800 | 0.52573 | 0.54178 | 0.54947 |
| G3 | −0.39381 | −0.61536 | −1.04670 | −0.25630 | −0.30162 | −0.34860 |
| G4 | −1.04431 | −1.34311 | −1.39640 | −1.17246 | −1.97732 | −5.41243 |
| G5 | 0.69019 | 0.66982 | 0.65565 | 0.67721 | 0.61333 | 0.41738 |
| G6 | 0.73279 | 0.70839 | 0.73538 | 0.71887 | 0.65509 | 0.54219 |
| G7 | 1.97444 | 1.87994 | 1.97184 | 2.06254 | 1.97813 | 1.81819 |
| G8 | 1.73678 | 1.75945 | 1.74404 | 1.63617 | 1.56785 | 1.43877 |

[Other Data]

| | |
|---|---|
| D1 | 7.100 |
| D2 | 17.600 |
| Δd1 | −83.395 |
| Δd2 | 0.000 |
| Δd3 | 33.605 |
| fL1 | 294.822 |
| fR | 151.950 |
| fF1 | −69.349 |
| fF2 | −99.312 |

Figure 14A:
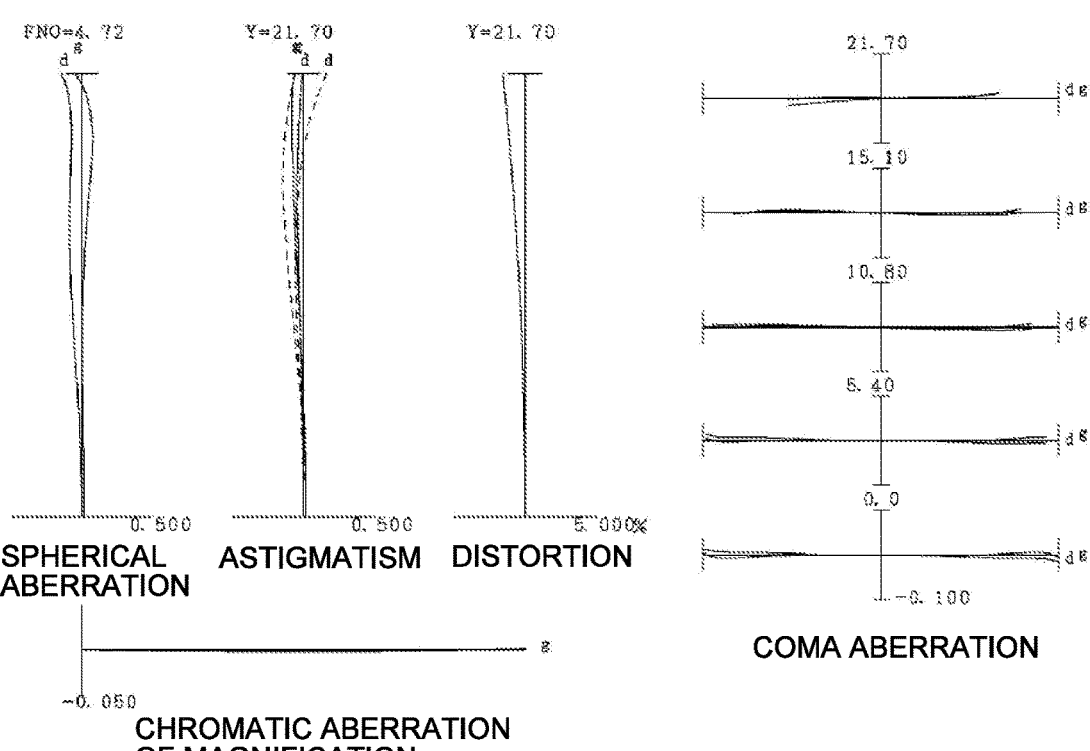
FIGS. 14A and 14B are graphs respectively showing various aberrations of the zoom optical system according to the fifth example upon focusing on infinity in a wide angle end state and a telephoto end state.
Figure 14B:
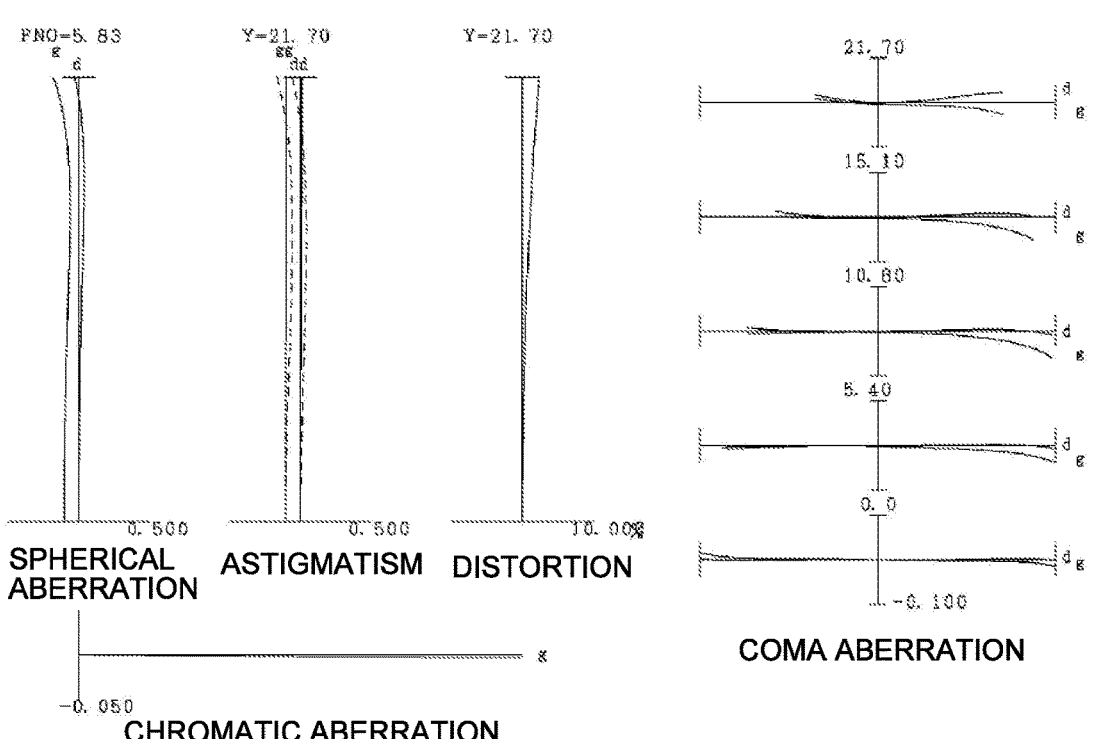
Figure 15A:
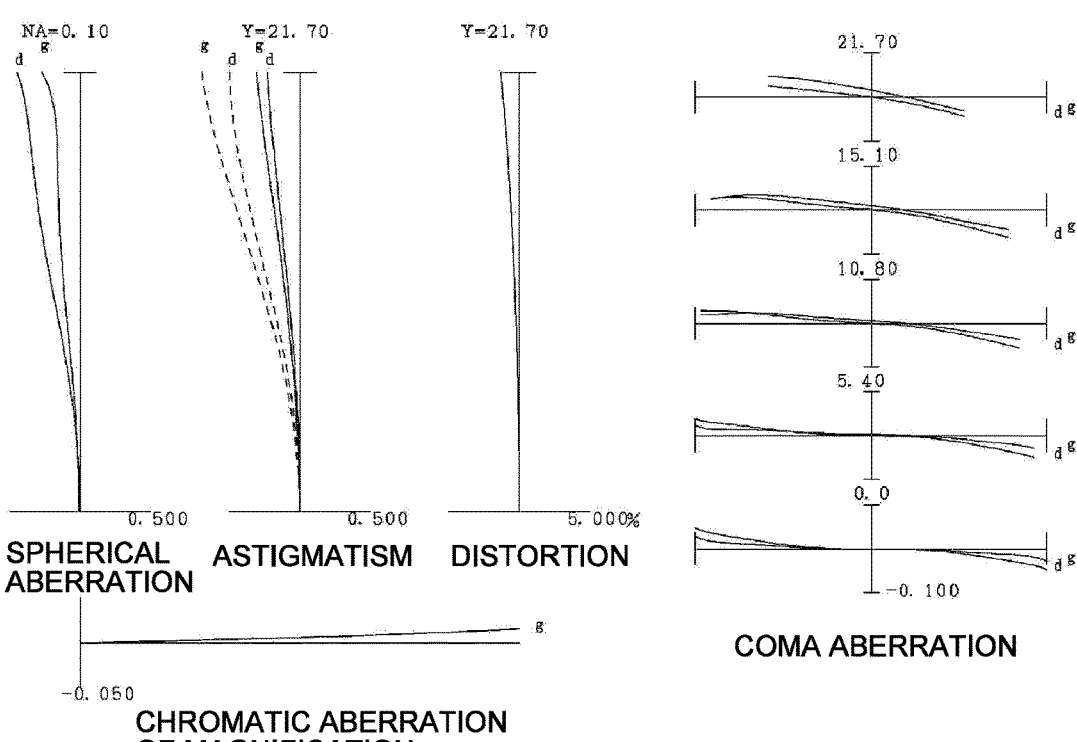
FIGS. 15A and 15B are graphs respectively showing various aberrations of the zoom optical system according to the fifth example upon focusing on a short distance object in the wide angle end state and the telephoto end state.
Figure 15B:
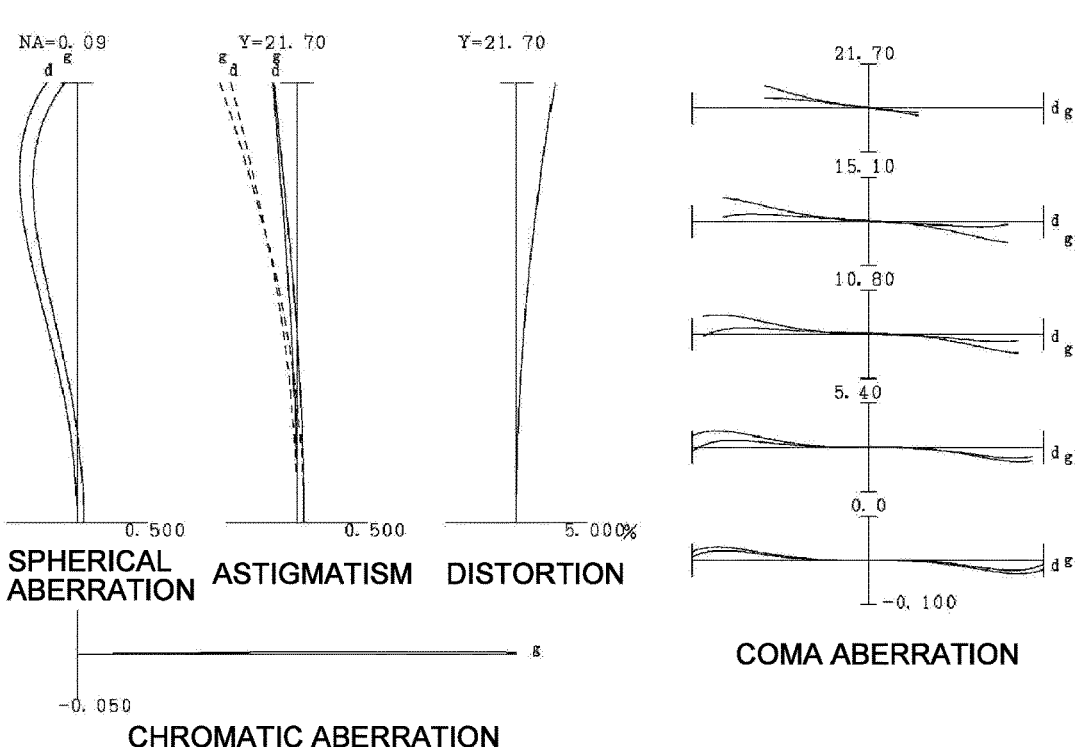

FIGS. 14A and 14B are graphs respectively showing various aberrations of the zoom optical system according to the fifth example upon focusing on infinity in the wide angle end state and the telephoto end state. FIGS. 15A and 15B are graphs respectively showing various aberrations of the zoom optical system according to the fifth example upon focusing on a short distance object in the wide angle end state and the telephoto end state.

The graphs showing various aberrations exhibit that the zoom optical system according to the fifth example favorably corrects various aberrations and has an excellent imaging performance from the wide angle end state to the telephoto end state, and further has an excellent imaging performance also upon focusing on the short distance object.

Sixth Example

Figure 16:
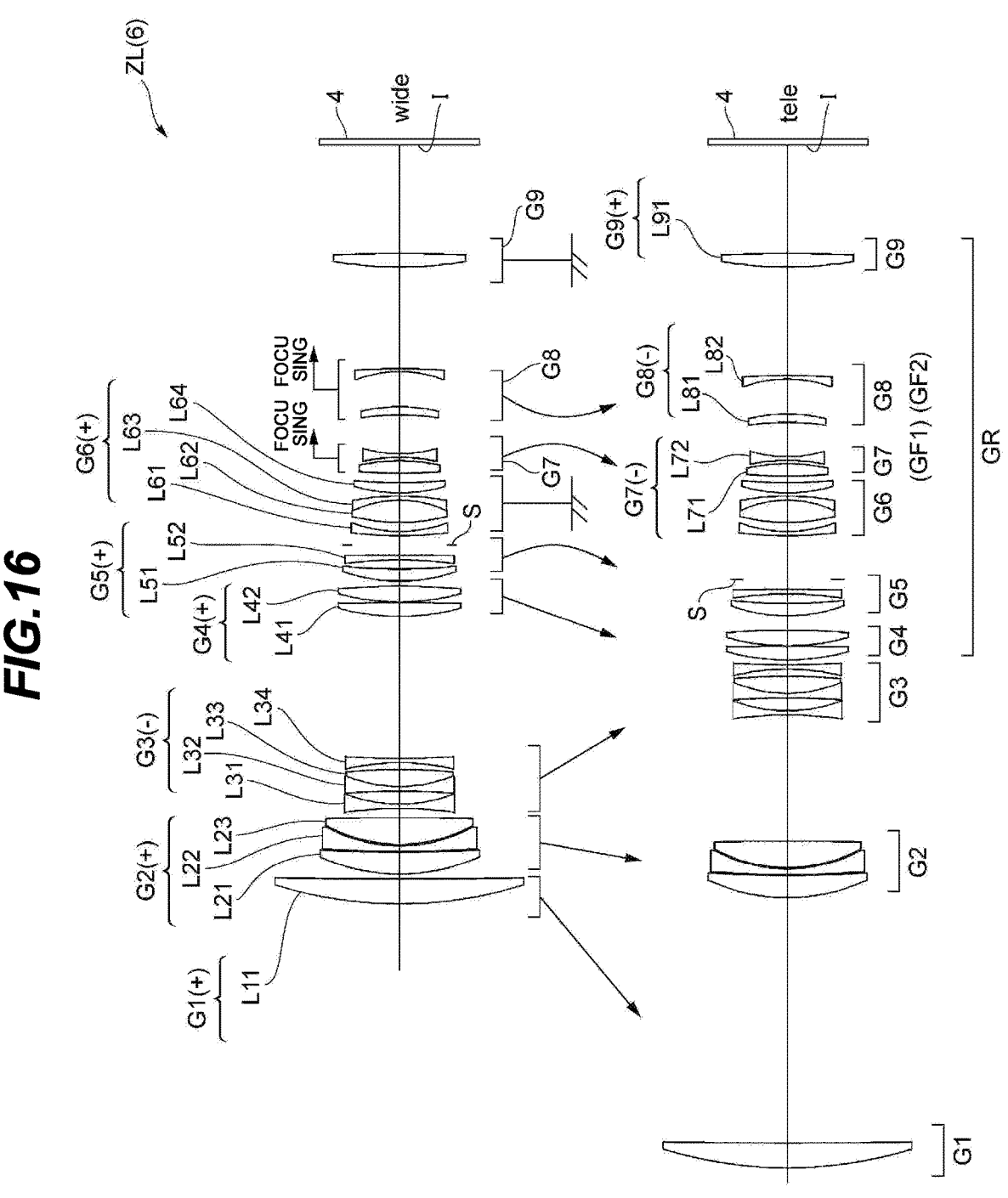
FIG. 16 shows a lens configuration of a zoom optical system according to a sixth example.

A sixth example is described with reference to FIGS. 16 to 18A and 18B and Table 6. FIG. 16 is a lens configuration diagram of a zoom optical system according to the sixth example. The zoom optical system ZL(6) according to the sixth example consists of, in order from the object: a first lens group G1 having a positive refractive power; a second lens group G2 having a positive refractive power; a third lens group G3 having a negative refractive power; a fourth lens group G4 having a positive refractive power; a fifth lens group G5 having a positive refractive power; an aperture stop S; a sixth lens group G6 having a positive refractive power; a seventh lens group G7 having a negative refractive power; an eighth lens group G8 having a negative refractive power; and a ninth lens group G9 having a positive refractive power. Note that an imaging element 4 that includes an image surface I is disposed on the image-side of the ninth lens group G9.

Upon zooming from the wide angle end state (W) to the telephoto end state (T), the first to fifth lens groups G1 to G5, and the seventh and eighth lens groups G7 and G8 move in the axial direction as indicated by arrows in FIG. 16, and the distances between lens groups adjacent to each other change. Note that the sixth and ninth lens groups G6 and G9 are fixed and stationary upon zooming. Note that the lens group that consists of the fourth to ninth lens groups G4 to G9 corresponds to the rear group GR.

The first lens group G1 consists of a positive meniscus lens L11 having a convex surface facing the object.

The second lens group G2 consists of, in order from the object: a positive meniscus lens L21 having a convex surface facing the object; a negative meniscus lens L22 having a convex surface facing the object; and a biconvex positive lens L23.

The third lens group G3 consists of, in order from the object: a biconcave negative lens L31; a cemented lens including a biconcave negative lens L32, and a biconvex positive lens L33; and a biconcave negative lens L34.

The fourth lens group G4 consists of, in order from the object: a biconvex positive lens L41; and a biconvex positive lens L42.

The fifth lens group G5 consists of, in order from the object: a positive meniscus lens L51 having a convex surface facing the object; a negative meniscus lens L52 having a concave surface facing the object; and an aperture stop S. The aperture stop S is provided on the image-side of the fifth lens group G5, and moves with the fifth lens group G5 upon zooming.

The sixth lens group G6 consists of, in order from the object: a negative meniscus lens L61 having a convex surface facing the object; a cemented lens including a biconvex positive lens L62 and a negative meniscus lens L63 having a concave surface facing the object; and a positive meniscus lens L64 having a convex surface facing the object. Note that the cemented lens including the positive lens L62 and the negative meniscus lens L63 is a vibration proof lens controlled to move perpendicular to the optical axis. Camera shake correction and the like are performed by this lens.

The seventh lens group G7 consists of, in order from the object: a biconvex positive lens L71; and a biconcave negative lens L72. The seventh lens group G7 constitutes a first focusing lens group GF1 that is moved upon focusing.

The eighth lens group G8 consists of, in order from the object: a positive meniscus lens L81 having a concave surface facing the object; and a negative meniscus lens L82 having a concave surface facing the object. The eighth lens group G8 constitutes a second focusing lens group GF2 that is moved upon focusing.

The ninth lens group G9 comprises a biconvex positive lens L91.

In this example, as described above, the seventh lens group G7 constitutes the first focusing lens group GF1, and the eighth lens group G8 constitutes the second focusing lens group GF2. As the state of focusing on a long distance object (infinity object) is changed to the state of focusing on a short distance object, both the focusing lens groups GF1 and GF2 move toward the image as indicated by the arrows. Here, when the state of focusing on the long distance object (infinity object) is changed to the state of focusing on the short distance object in the wide angle end state, the amount of movement of the first focusing lens group GF1 is larger than the amount of movement of the second focusing lens group GF2. On the other hand, when the state of focusing on the long distance object (infinity object) is changed to the state of focusing on the short distance object in the telephoto end state, the amount of movement of the first focusing lens group GF1 is slightly larger than or equivalent to the amount of movement of the second focusing lens group GF2.

The following Table 6 lists values of data on the zoom optical system according to the sixth example.

TABLE 6

| [General Data] | | | |
| --- | --- | --- | --- |
| | W | M | T |
| Entire Focal length f | 103.00 | 200.00 | 388.00 |
| Fno. | 4.79 | 4.83 | 5.83 |
| 2ω | 24.00 | 12.20 | 61.00 |
| Entire Length TL | 230.02 | 283.37 | 310.00 |
| Bf | 32.80 | 32.80 | 32.80 |

| [Lens Data] | | | |
| --- | --- | --- | --- |
| Surface | R | D | nd | vd |
| 1) | 125.9920 | 7.500 | 1.48749 | 70.32 |
| 2) | 2337.2446 | (d1) | Variable | |
| 3) | 56.6122 | 6.700 | 1.43385 | 95.23 |
| 4) | 405.7473 | 0.200 | | |
| 5) | 285.7363 | 1.800 | 1.83400 | 37.18 |
| 6) | 45.4031 | 0.400 | | |
| 7) | 45.3768 | 8.100 | 1.43385 | 95.23 |
| 8) | −985.4010 | (d2) | Variable | |
| 9) | −121.3238 | 1.300 | 1.49782 | 82.57 |
| 10) | 45.2460 | 3.913 | | |
| 11) | −219.1132 | 1.400 | 1.75500 | 52.33 |
| 12) | 41.5079 | 5.122 | 2.00100 | 29.12 |
| 13) | −205.7641 | 2.090 | | |
| 14) | −70.1006 | 1.300 | 1.72916 | 54.61 |
| 15) | 222.9918 | (d3) | Variable | |
| 16) | 68.7539 | 4.155 | 1.49700 | 81.54 |
| 17) | −1376.4126 | 0.200 | | |
| 18) | 70.8280 | 4.774 | 1.49700 | 81.54 |

TABLE 6-continued

| | | | | |
|---|---|---|---|---|
| 19) | −198.7875 | (d4) | Variable | |
| 20) | 50.2645 | 3.670 | 1.49782 | 82.57 |
| 21) | 159.3159 | 2.838 | | |
| 22) | −111.4927 | 1.400 | 1.48749 | 70.32 |
| 23) | −1001.6428 | 3.000 | | |
| 24) | 0.0000 | (d5) | Variable | Aperture stop S |
| 25) | 118.9159 | 1.300 | 2.00069 | 25.46 |
| 26) | 39.7302 | 2.777 | | |
| 27) | 59.1890 | 6.750 | 1.60300 | 65.44 |
| 28) | −33.1056 | 1.200 | 1.83400 | 37.18 |
| 29) | −79.3818 | 1.000 | | |
| 30) | 48.9629 | 3.035 | 1.73800 | 32.33 |
| 31) | 135.6871 | (d6) | Variable | |
| 32) | 144.8538 | 3.713 | 1.73800 | 32.33 |
| 33) | −56.0133 | 1.018 | | |
| 34) | −54.2284 | 1.100 | 1.77250 | 49.62 |
| 35) | 40.7236 | (d7) | Variable | |
| 36) | −78.3572 | 2.539 | 1.68893 | 31.16 |
| 37) | −49.2437 | 10.535 | | |
| 38) | −37.5910 | 1.100 | 1.76385 | 48.49 |
| 39) | −159.9882 | (d8) | Variable | |
| 40) | 121.2724 | 4.090 | 1.60342 | 38.03 |
| 41) | −528.7246 | 32.801 | | |
| Image Surface (I) | ∞ | | | |

[Lens Group Data]

| Group | First surface | Focal length |
|---|---|---|
| f1 | 1 | 272.873 |
| f2 | 3 | 669.663 |
| f3 | 9 | −44.567 |
| f4 | 16 | 59.598 |
| f5 | 20 | 318.669 |
| f6 | 25 | 120.008 |
| f7 | 32 | −71.109 |
| f8 | 36 | −105.879 |
| f9 | 40 | 163.866 |

| | W infinity | M infinity | T infinity | W vicinity | M vicinity | T vicinity |
|---|---|---|---|---|---|---|
| | | | [Variable Distance Data] | | | |
| f($\beta$) | 102.99713 | 199.99997 | 387.99998 | −0.12317 | −0.21440 | −0.35034 |
| (d1) | 1.50000 | 51.41466 | 74.36616 | 1.50000 | 51.41466 | 74.36616 |
| (d2) | 2.78743 | 21.86893 | 38.13088 | 2.78743 | 21.86893 | 38.13088 |
| (d3) | 43.10977 | 22.50550 | 1.50000 | 43.10977 | 22.50550 | 1.50000 |
| (d4) | 1.50000 | 7.74332 | 4.48521 | 1.50000 | 7.74332 | 4.48521 |
| (d5) | 2.78339 | 1.50000 | 13.17816 | 2.78339 | 1.50000 | 13.17816 |
| (d6) | 2.91369 | 7.23970 | 2.04512 | 3.29693 | 12.62563 | 30.72211 |
| (d7) | 11.77968 | 4.36491 | 10.41687 | 21.89229 | 8.24680 | 12.74366 |
| (d8) | 30.82578 | 33.91392 | 33.05806 | 20.33048 | 14.64601 | 2.05695 |
| | | | [Each Group Magnification] | | | |
| G1 | 0.00000 | 0.00000 | 0.00000 | −0.54863 | −0.61447 | −0.65309 |
| G2 | 0.69930 | 0.73775 | 0.75689 | 0.60476 | 0.62272 | 0.63000 |
| G3 | −0.38151 | −0.61911 | −1.03867 | −0.24742 | −0.29907 | −0.34849 |
| G4 | −1.11481 | −1.37180 | −1.44873 | −1.25512 | −2.04228 | −5.74217 |
| G5 | 0.71125 | 0.69713 | 0.68538 | 0.69822 | 0.64109 | 0.44208 |
| G6 | 0.68417 | 0.66234 | 0.69266 | 0.66835 | 0.60291 | 0.47853 |
| G7 | 1.97284 | 1.88369 | 1.96468 | 2.05944 | 1.97503 | 1.81525 |
| G8 | 1.67943 | 1.70857 | 1.70053 | 1.58030 | 1.52660 | 1.40770 |
| G9 | 0.78714 | 0.78715 | 0.78714 | 0.78715 | 0.78715 | 0.78715 |

[Other Data]

| | |
|---|---|
| D1 | 7.500 |
| D2 | 17.200 |
| $\Delta$d1 | −79.982 |
| $\Delta$d2 | −7.116 |
| $\Delta$d3 | 28.228 |
| fL1 | 272.873 |
| fR | 163.866 |
| fF1 | −71.109 |
| fF2 | −105.879 |

Figure 17A:
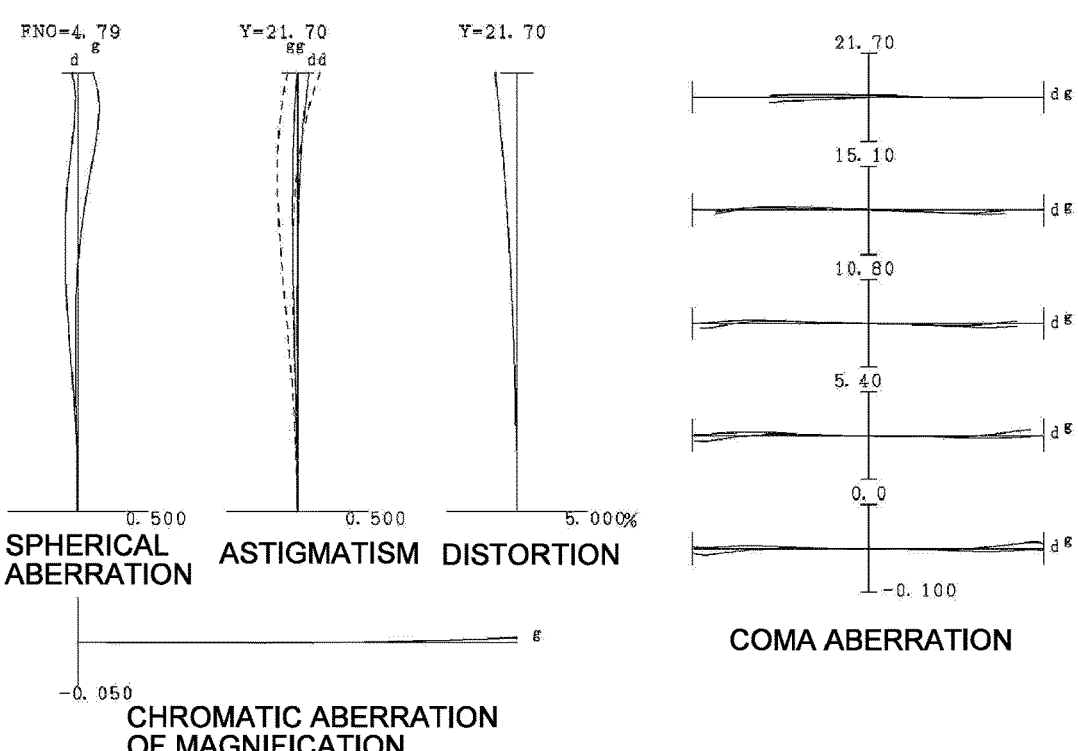
FIGS. 17A and 17B are graphs respectively showing various aberrations of the zoom optical system according to the sixth example upon focusing on infinity in a wide angle end state and a telephoto end state.
Figure 17B:
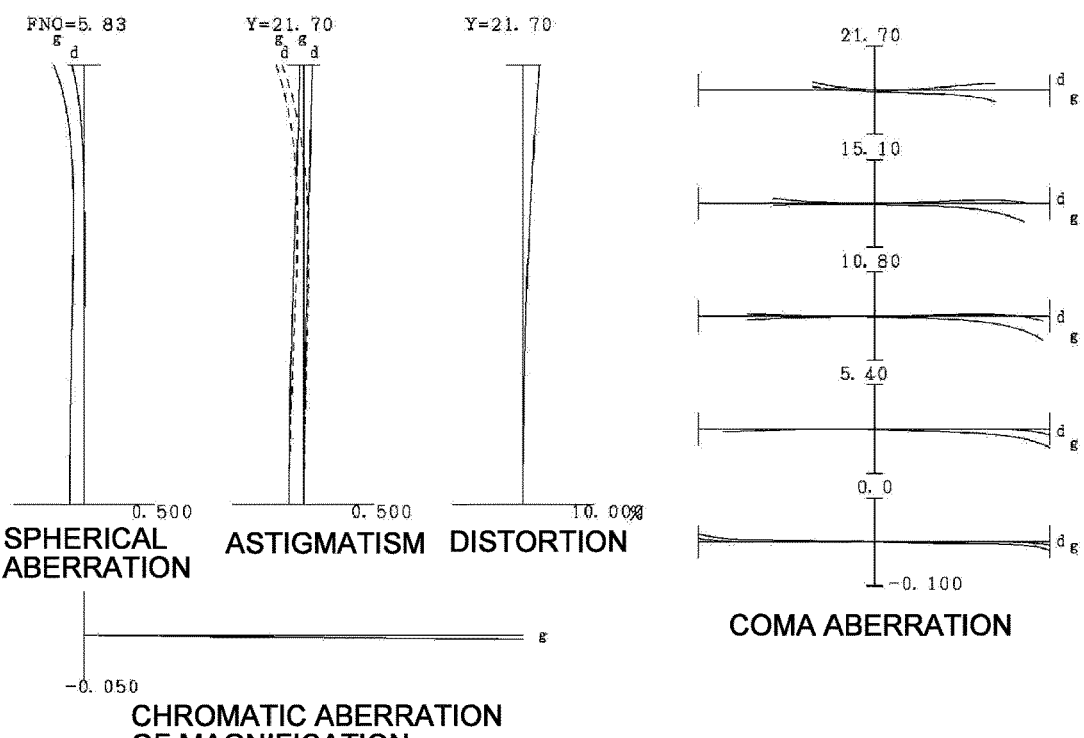
Figure 18A:
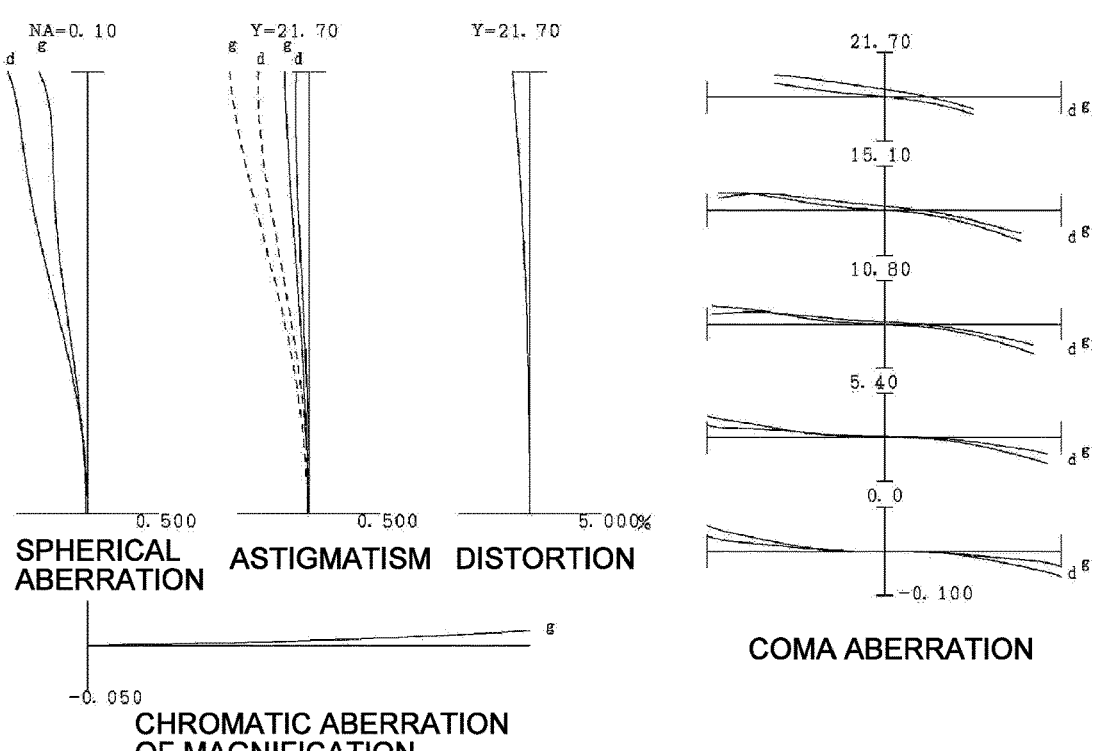
FIGS. 18A and 18B are graphs respectively showing various aberrations of the zoom optical system according to the sixth example upon focusing on a short distance object in the wide angle end state and the telephoto end state.
Figure 18B:
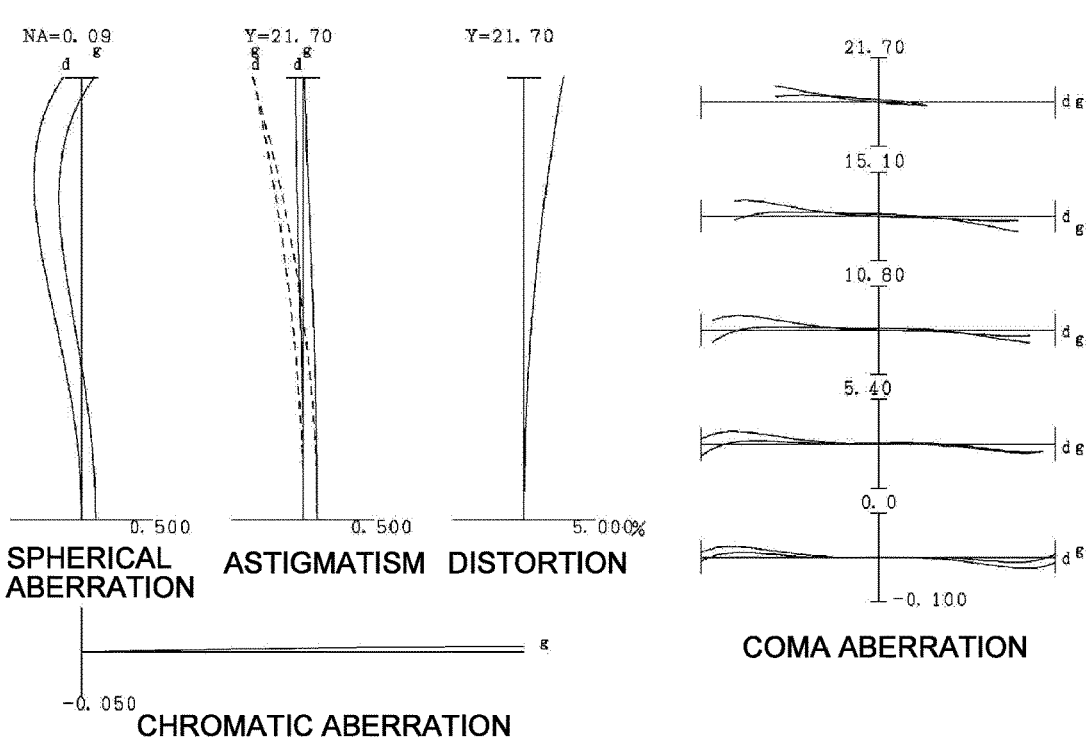

FIGS. 17A and 17B are graphs respectively showing various aberrations of the zoom optical system according to the sixth example upon focusing on infinity in the wide angle end state and the telephoto end state. FIGS. 18A and 18B are graphs respectively showing various aberrations of the zoom optical system according to the sixth example upon focusing on a short distance object in the wide angle end state and the telephoto end state.

The graphs showing various aberrations exhibit that the zoom optical system according to the sixth example favorably corrects various aberrations and has an excellent imaging performance from the wide angle end state to the telephoto end state, and further has an excellent imaging performance also upon focusing on the short distance object.

Lastly, the table of [Conditional Expression Corresponding Value] is shown below. This table collectively indicates values corresponding to the conditional expressions (1) to (13) with respect to all the examples (first to sixth examples).

| | |
|---|---|
| $0.10 < D1/D2 < 1.80$ | Conditional expression (1) |
| $0.10 < (-\Delta d1)/TLw < 0.50$ | Conditional expression (2) |
| $|\Delta d2/\Delta d1| < 0.20$ | Conditional expression (3) |
| $0.05 < \Delta d3/TLw < 0.25$ | Conditional expression (4) |
| $2\omega w < 36.0°$ | Conditional expression (5) |
| $2\omega t < 10.0°$ | Conditional expression (6) |
| $0.20 < fw/fL1 < 1.00$ | Conditional expression (7) |
| $-1.00 < f1/f2 < 2.00$ | Conditional expression (8) |
| $0.00 < f1/(-f3) < 1.00$ | Conditional expression (9) |
| $-0.050 < f3/f2 < 0.500$ | Conditional expression (10) |
| $80.00 < vd2$ | Conditional expression (11) |
| $0.10 < fR/fw < 2.00$ | Conditional expression (12) |
| $0.20 < fF1/fF2 < 2.00$ | Conditional expression (13) |

[Conditional Expression Corresponding Value]

| Conditional Expression | First~Third Example | | |
|---|---|---|---|
| | First Example | Second Example | Third Example |
| (1) | 0.734 | 0.749 | 0.777 |
| (2) | 0.213 | 0.196 | 0.225 |
| (3) | 0.000 | 0.000 | 0.000 |
| (4) | 0.118 | 0.105 | 0.111 |
| (5) | 24.00 | 24.00 | 24.00 |
| (6) | 6.10 | 6.10 | 6.10 |
| (7) | 0.50 | 0.46 | 0.39 |
| (8) | −0.063 | −0.180 | −0.260 |
| (9) | 0.229 | 0.265 | 0.257 |
| (10) | 0.014 | 0.048 | 0.067 |
| (11) | 95.00 | 95.25 | 95.23 |
| (12) | 0.887 | 0.957 | 0.923 |
| (13) | 0.94 | 0.81 | 0.62 |

[Conditional Expression Corresponding Value]

| Conditional Expression | Fourth~Sixth Example | | |
|---|---|---|---|
| | Fourth Example | Fifth Example | Sixth Example |
| (1) | 0.340 | 0.403 | 0.436 |
| (2) | 0.365 | 0.363 | 0.348 |
| (3) | 0.000 | 0.000 | 0.089 |
| (4) | 0.116 | 0.146 | 0.123 |
| (5) | 24.00 | 24.00 | 24.00 |
| (6) | 6.10 | 6.10 | 6.10 |
| (7) | 0.73 | 0.78 | 0.84 |
| (8) | 0.887 | 0.543 | 0.407 |
| (9) | 0.161 | 0.153 | 0.163 |
| (10) | −0.143 | −0.083 | −0.067 |
| (11) | 95.23 | 95.23 | 95.23 |
| (12) | 1.191 | 0.661 | 0.712 |
| (13) | 0.57 | 0.70 | 0.67 |

The first to sixth examples described above show specific examples of this embodiment. This embodiment is not limited to these examples.

Note that the following content can be adopted in a range without impairing the optical performance of the zoom optical system according to this embodiment.

As numerical examples of the zoom optical systems, those having the seven- to nine-group structures are described. However, the present application is not limited thereto. A zoom optical system having another group configuration (e.g., a ten-group structure etc.) may be configured. Specifically, a configuration may be adopted where a lens or a lens group is added to a place closest to the object or a place closest to the image surface in the zoom optical system. Note that the lens group indicates a portion that includes at least one lens separated by air distances that change during zooming.

The lens surface may be made of a spherical surface or a planar surface, or an aspherical surface. A case where the lens surface is a spherical surface or a planar surface is preferable, because lens processing, and assembling and adjustment are facilitated, and the optical performance degradation due to errors caused by processing and assembling and adjustment can be prevented. It is also preferable because the degradation in representation performance even with the image surface being misaligned is small.

In the cases where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

As to the aperture stop, a member as the aperture stop is not necessarily provided, and a lens frame may replace the member to function alternatively.

An antireflection film having a high transmissivity in a wide wavelength region may be applied onto each lens surface in order to reduce flares and ghosts and achieve optical performances having a high contrast. This can reduce flares and ghosts, and achieve optical performances having a high contrast.

EXPLANATION OF NUMERALS AND
CHARACTERS

| | |
|---|---|
| G1 First lens group | G2 Second lens group |
| G3 Third lens group | G4 Fourth lens group |
| G5 Fifth lens group | G6 Sixth lens group |
| G7 Seventh lens group | G8 Eighth lens group |
| G9 Ninth lens group | |
| GR Rear group | S Aperture stop |
| GF1 First focusing lens group | GF2 Second focusing lens group |
| I Image surface | 4 Imaging element |

The invention claimed is:

1. A zoom optical system essentially consisting of, in order from an object on an optical axis: a first lens group having a positive refractive power; a second lens group; a third lens group having a negative refractive power; and a rear group that includes a plurality of lens groups, wherein upon zooming from a wide angle end to a telephoto end, a distance between the first lens group and the second lens group increases, a distance between the second lens group and the third lens group increases, and a distance between the third lens group and a lens group disposed closest to the object in the rear group decreases, focusing is done by moving at least one of the plurality of lens groups included in the rear group in an optical axis direction, and the following conditional expressions are satisfied:

$$0.10 < D1/D2 < 1.80$$

$$0.00 < f1/(-f3) < 1.00$$

where

D1: a length on the optical axis from a lens surface closest to the object to a lens surface closest to an image in the first lens group, D2: a length on the optical axis from a lens surface closest to the object to a lens surface closest to the image in the second lens group, f1: a focal length of the first lens group, and f3: a focal length of the third lens group.

2. The zoom optical system according to claim 1, wherein the first lens group consists of two lenses or less.

3. The zoom optical system according to claim 1, wherein the second lens group consists of two or more lenses.

4. The zoom optical system according to claim 1, wherein the third lens group consists of two or more lenses.

5. The zoom optical system according to claim 1, wherein the following conditional expression is satisfied:

$$0.10 < (-\Delta d1)/TLw < 0.50$$

where $\Delta d1$: an amount of movement of the first lens group upon zooming from the wide angle end to the telephoto end, TLw: an entire length of the optical system in the wide angle end state, and movement toward an image surface is chosen to be positive.

6. The zoom optical system according to claim 1, wherein the following conditional expression is satisfied:

$$|\Delta d2/\Delta d1| < 0.20$$

where $\Delta d1$: an amount of movement of the first lens group upon zooming from the wide angle end to the telephoto end, $\Delta d2$: an amount of movement of the second lens group upon zooming from the wide angle end to the telephoto end, and movement toward an image surface is chosen to be positive.

7. The zoom optical system according to claim 1, wherein the following conditional expression is satisfied:

$$0.05 < \Delta d3/TLw < 0.25$$

where $\Delta d3$: an amount of movement of the third lens group upon zooming from the wide angle end to the telephoto end, TLw: an entire length of the optical system in the wide angle end state, and movement toward an image surface is chosen to be positive.

8. The zoom optical system according to claim 1, wherein the following conditional expression is satisfied:

$$2\omega w < 36.0°$$

where $2\omega w$: a full angle of view upon focusing on an infinity object in the wide angle end state.

9. The zoom optical system according to claim 1, wherein the following conditional expression is satisfied:

$$2\omega t < 10.0° \text{ where}$$

$2\omega t$: a full angle of view upon focusing on an infinity object in the telephoto end state.

10. The zoom optical system according to claim 1, wherein the following conditional expression is satisfied:

$$0.20 < fw/fL1 < 1.00$$

where fw: a focal length of the entire zoom optical system in the wide angle end state, and fL1: a focal length of a positive lens closest to the object.

11. The zoom optical system according to claim 1, wherein all the lenses constituting the first lens group are lenses having positive refractive powers.

12. The zoom optical system according to claim 1, wherein the following conditional expression is satisfied:

$$-1.00 < f1/f2 < 2.00$$

where f1: the focal length of the first lens group, and f2: a focal length of the second lens group.

13. The zoom optical system according to claim 1, wherein the following conditional expression is satisfied:

$$-0.050 < f3/f2 < 0.500$$

where f2: a focal length of the second lens group, and f3: the focal length of the third lens group.

14. The zoom optical system according to claim 1, wherein an Abbe number vd2 of at least one lens included in the second lens group satisfies the following conditional expression:

$$80.00 < vd2.$$

15. The zoom optical system according to claim 1, wherein a final lens group that is included in the rear group and disposed closest to the image is fixed in an optical axis direction upon zooming.

16. The zoom optical system according to claim 1, wherein the following conditional expression is satisfied:

$$0.10 < fR/fw < 2.00 \qquad 5$$

where fR: a focal length of a final lens group that is included in the rear group and disposed closest to the image, and fw: a focal length of the entire zoom optical system in the wide angle end state.

17. The zoom optical system according to claim 1, wherein the rear group includes, in order from the object: a first focusing lens group; and a second focusing lens group, and the following conditional expression is satisfied:

$$0.20 < fF1/fF2 < 2.00$$

where fF1: a focal length of the first focusing lens group, and fF2: a focal length of the second focusing lens group.

18. The zoom optical system according to claim 17, in combination with an aperture stop, wherein the first focusing lens group and the second focusing lens group are each disposed closer to the image than the aperture stop.

19. An optical apparatus comprising the zoom optical system according to claim 1.

20. A method for manufacturing a zoom optical system consisting of, in order from an object on an optical axis: a first lens group having a positive refractive power; a second lens group; a third lens group having a negative refractive power; and a rear group that includes a plurality of lens groups, the method comprising one of the following features A, B and C, wherein the feature A comprises:

disposing the first lens group, the second lens group, the third lens group and the rear group in a lens barrel in order from an object on an optical axis so that:

upon zooming from a wide angle end to a telephoto end, a distance between the first lens group and the second lens group increases, a distance between the second lens group and the third lens group increases, and a distance between the third lens group and a lens group disposed closest to the object in the rear group decreases, focusing is done by moving at least one of the plurality of lens groups included in the rear group in an optical axis direction, and the following conditional expressions are satisfied:

$$0.10 < D1/D2 < 1.80$$

$$0.00 < f1/(-f3) < 1.00$$

where

D1: a length on the optical axis from a lens surface closest to the object to a lens surface closest to an image in the first lens group, D2: a length on the optical axis from a lens surface closest to the object to a lens surface closest to the image in the second lens group, f1: a focal length of the first lens group, and f3: a focal length of the third lens group, the feature B comprises:

the rear group includes five lens groups, the rear group has a fourth lens group having a positive refractive power which is placed closest to the object out of the five lens groups, disposing the first lens group, the second lens group, the third lens group and the rear group in a lens barrel in order from an object on an optical axis so that:

upon zooming from a wide angle end to a telephoto end, a distance between the first lens group and the second lens group increases, and a distance between the third lens group and the fourth lens group decreases, out of the first lens group, the second lens group, the third lens group and the five lens groups of the rear group, two lens groups are stationary during zooming, six lens groups move in an optical axis direction upon zooming, one lens group out of the six lens groups moves so that a position at the wide angle end is closer to the object than a position at the telephoto end, and five lens groups out of the six lens groups respectively move so that a position at the wide angle end is closer to an image than a position at the telephoto end, and the following conditional expression is satisfied:

$$0.10 < D1/D2 < 1.80$$

where

D1: a length on the optical axis from a lens surface closest to the object to a lens surface closest to an image in the first lens group, and D2: a length on the optical axis from a lens surface closest to the object to a lens surface closest to the image in the second lens group, and the feature C comprises:

the rear group includes five lens groups, the second lens group consists of two or more lenses, disposing the first lens group, the second lens group, the third lens group and the rear group in a lens barrel in order from an object on an optical axis so that:

upon zooming from a wide angle end to a telephoto end, distances between adjacent lens groups change, out of the first lens group, the second lens group, the third lens group and the five lens groups of the rear group, two lens groups are stationary during zooming, and six lens groups move in an optical axis direction during zooming, and the following conditional expression is satisfied:

$$0.10 < D1/D2 < 1.80$$

where

D1: a length on the optical axis from a lens surface closest to the object to a lens surface closest to an image in the first lens group, and D2: a length on the optical axis from a lens surface closest to the object to a lens surface closest to the image in the second lens group.

21. A zoom optical system essentially consisting of, in order from an object on an optical axis: a first lens group having a positive refractive power; a second lens group having a negative refractive power; a third lens group having a negative refractive power; and a rear group that includes five lens groups, wherein the rear group has a fourth lens group having a positive refractive power which is placed closest to the object out of the five lens groups, upon zooming from a wide angle end to a telephoto end, a distance between the first lens group and the second lens group increases, and a distance between the third lens group and the fourth lens group decreases, out of the first lens group, the second lens group, the third lens group and the five lens groups of the rear group, two lens groups are stationary during zooming, six lens groups move in an optical axis direction upon zooming, one lens group out of the six lens groups moves so that a position at the wide angle end is closer to the object than a position at the telephoto end, and five lens groups out of the six lens groups respectively move so that a position at the wide angle end is closer to an image than a position at the telephoto end, and the following conditional expression is satisfied:

$$0.10 < D1/D2 < 1.80$$

where

D1: a length on the optical axis from a lens surface closest to the object to a lens surface closest to an image in the first lens group, and D2: a length on the optical axis from a lens surface closest to the object to a lens surface closest to the image in the second lens group.

22. A zoom optical system essentially consisting of, in order from an object on an optical axis: a first lens group having a positive refractive power; a second lens group having a negative refractive power; a third lens group having a negative refractive power; and a rear group that includes five lens groups, wherein the second lens group consists of two or more lenses, upon zooming from a wide angle end to a telephoto end, distances between adjacent lens groups change, out of the first lens group, the second lens group, the third lens group and the five lens groups of the rear group, two lens groups are stationary during zooming, and six lens groups move in an optical axis direction during zooming, and the following conditional expression is satisfied:

$$0.10 < D1/D2 < 1.80$$

where

D1: a length on the optical axis from a lens surface closest to the object to a lens surface closest to an image in the first lens group, and D2: a length on the optical axis from a lens surface closest to the object to a lens surface closest to the image in the second lens group.

* * * * *